(12) United States Patent
Raykhman et al.

(10) Patent No.: US 6,581,047 B1
(45) Date of Patent: Jun. 17, 2003

(54) METHOD FOR A SEQUENTIAL PREDICTION OF BINARY ELEMENT'S STATE IN A BINARY PROCESS AND THE SYSTEM FOR THE METHOD IMPLEMENTATION

(75) Inventors: Alexander M. Raykhman, East Greenwich, RI (US); Ilya Vinarskiy, Pawtucket, RI (US)

(73) Assignee: Inesa, Inc., East Greenwich, RI (US)

( * ) Notice: Subject to any disclaimer, the term of this patent is extended or adjusted under 35 U.S.C. 154(b) by 0 days.

(21) Appl. No.: 09/287,848

(22) Filed: Apr. 7, 1999

(51) Int. Cl.$^7$ .................................................. G06N 7/08
(52) U.S. Cl. ........................................ 706/21; 382/243
(58) Field of Search ............................. 375/240, 240.12, 375/253; 358/261.2; 382/243; 706/22

(56) References Cited

U.S. PATENT DOCUMENTS

| | | | | |
|---|---|---|---|---|
| 4,237,484 A | * | 12/1980 | Brown et al. | .......... 375/240.12 |
| 4,259,693 A | * | 3/1981 | Aaron et al. | ............. 358/261.2 |
| 4,479,241 A | | 10/1984 | Buckley | ..................... 382/159 |
| 4,697,242 A | | 9/1987 | Holland et al. | ............... 395/13 |
| 4,718,105 A | * | 1/1988 | Lipkie et al. | ............... 382/243 |
| 4,821,333 A | | 4/1989 | Gillies | ........................ 382/308 |
| 5,136,686 A | | 8/1992 | Koza | .......................... 395/13 |
| 5,222,192 A | | 6/1993 | Shaefer | ........................ 395/13 |
| 5,255,345 A | | 10/1993 | Shaefer | ........................ 395/13 |
| 5,291,284 A | * | 3/1994 | Carr et al. | ............. 375/240.12 |
| 5,424,942 A | | 6/1995 | Dong | ........................ 364/164 |
| 5,956,702 A | * | 9/1999 | Matsuoka et al. | ............ 706/22 |
| 5,991,340 A | * | 11/1999 | Isomura | ..................... 375/253 |
| 6,055,273 A | * | 4/2000 | Isomura | ..................... 375/240 |

OTHER PUBLICATIONS

G.A. Korn, T.M. Korn, Mathematical Handbook for Scientists and Engineers, McGraw–Hill Book Company, Inc. 1961.

(List continued on next page.)

*Primary Examiner*—Wilbert L. Starks, Jr.
(74) *Attorney, Agent, or Firm*—McCormick, Paulding & Huber LLP

(57) ABSTRACT

The method for a sequential prediction of a binary element's state in a binary process and the system for the method implementation are based on the binary process representation by a unique sequence of binary elementary behavioral functions. These elementary behavioral functions are used for building a genotype of the binary process' behaviors. The behavioral genotype is periodically updated through the analysis of the binary process history. The behavioral genotype set defines a set of predicting functions with respect of an evaluation of the binary process' current instability level. The natural selection algorithm that operates upon the set of predicting functions is used in predicting procedures for a non-iterative determination of a state of the forthcoming binary process' element. If the binary process is non-stationary, then a cardinal number of the set of predicting functions is equal or less than a cardinal number of the behavioral genotype set.

The method allows performing real time predictions of binary processes, including non-stationary processes, regardless of the possible speed and memory limitations of computing means.

The predicting system for the method implementation increases the efficiency of functioning of any entity that includes this system as a subsystem.

54 Claims, 10 Drawing Sheets

OTHER PUBLICATIONS

J.H. Holland, Adaptation in Natural and Artificial Systems. The University of Michigan Press, Ann Arbor, 1975.

J.R. Koza, Genetic Programming: On the Programming of Computers by Means of Natural Selection, MIT Press, Cambridge, MA, 1992.

K. De Jong and W. Spears, On the State of Evolutionary Computation, Proceedings of the $5^{th}$ International Conference on Genetic Algorithms, University of Illinois, 1993.

R. Elmasri and S. Navathe, Fundamentals of Database Systems, 2–nd Edition, Addison–Wesley, 1994.

Math Cad$^{3.0}$, User's Guide, Windows Version, MathSoft, Inc. Cambridge, MA.

B. Kuo, Automatic Control Systems, $5^{th}$ ed. Prentice Hall, 1987, 720 pages.

* cited by examiner

FIG. 3

| # | | Sequential Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|---|
| | | # Cycle of Predictions | | | | | | | | | | | k | | | | | | | | | | k+1 | | | | | | |
| | | Behavioral Functions | | | b1 | | | | b2 | | b3 | | b4 | | | | b5 | | | | | | b6 | | | | | | |
| | | Binary Process | - | + | - | - | - | - | + | - | + | - | + | - | + | + | + | + | + | - | + | + | + | + | - | + | + | + | - |
| | | RF - functions | | | | | | | | | | | | | | | | | | | | | | | | | | | | |
| 1 | | 1p1n | | | | | | | | - | + | - | + | - | + | - | | | | | | | | | | | | | |
| 2 | | 1p2n | | | | | | | | - | + | - | + | | | | | | | | | | | | | | | | |
| 3 | | 1p3n | | | | | | | | - | - | - | | | | | | | | | | | | | | | | | |
| 4 | | 1p4n | | | | | | | | - | - | | | | | | | | | | | | | | | | | | |
| 5 | | 1p5n | | | | | | | | - | | | | | | | | | | | | | | | | | | | |
| 6 | | 2p1n | | | | | | | | + | + | - | - | - | - | - | | | | | | | | | | | | | |
| 7 | | 2p2n | | | | | | | | + | + | - | - | - | - | | | | | | | | | | | | | | |
| 8 | | 2p3n | | | | | | | | + | + | - | - | - | | | | | | | | | | | | | | | |
| 9 | | 2p4n | | | | | | | | + | + | - | - | | | | | | | | | | | | | | | | |
| 10 | | 3p1n | | | | | | | | + | + | + | + | + | + | + | - | | | | | | | | | | | | |
| 11 | | 3p2n | | | | | | | | + | + | + | + | + | + | + | + | - | | | | | | | | | | | |
| 12 | | 3p3n | | | | | | | | + | + | + | + | + | + | + | + | + | - | | | | | | | | | | |
| 13 | | 4p1n | | | | | | | | + | + | + | + | + | + | + | + | + | + | + | | | | | | | | | |
| 14 | | 4p2n | | | | | | | | + | + | + | + | + | + | + | + | + | + | + | | | | | | | | | |
| 15 | | 5p1n | | | | | | | | + | + | + | + | + | + | + | + | + | + | + | + | + | + | + | - | + | + | + | + |
| 16 | | C+ | | | | | | | | | | | | | | | + | + | + | + | | | | | | | | | |
| 17 | | C- | | | | | | | | - | | | | | | - | - | | | | | | | | | | | | |
| | | Reset | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 1 |
| | | Prediction | * | + | - | - | - | - | + | * | * | + | + | - | + | - | * | * | * | * | + | + | + | + | - | + | + | + | + |
| | | Efficacy Evaluation | | | | | | | | | R | R | R | R | R | W | | | | | R | R | R | R | R | R | R | R | W |

| # | Algorithm 1 Predicting Functions | W | x(τ) | f(τ) | R | Evaluation | # | Algorithm 2 Predicting Functions | W | x(τ) | f(τ) | R |
|---|---|---|---|---|---|---|---|---|---|---|---|---|
| 1 |  |  | + |  |  |  | 1 |  |  | + |  |  |
| 2 | 1p1n |  | - | * |  |  | 2 | 1p1n |  | - | * |  |
| 3 |  |  | - |  |  |  | 3 |  |  | - |  |  |
| 4 |  |  | - | - | 1 |  | 4 |  |  | - | - | 1 |
| 5 |  |  | - | - | 2 |  | 5 |  |  | - | - | 2 |
| 6 | 1p1n/1p4n/2p4n | 1 | + | - |  | 1 | 6 | 1p4n | 1 | + | - |  |
| 7 |  |  | + | * |  |  | 7 |  |  | + | * |  |
| 8 |  |  | + | * |  |  | 8 |  |  | + | + | 3 |
| 9 | 1p1n/3p1n/3p2n/3p3n | 2 | - | + |  | 0 | 9 | 3p1n/3p2n/3p3n | 2 | - | * |  |
| 10 |  |  | + | * |  |  | 10 |  |  | + | * |  |
| 11 |  |  | + | * |  |  | 11 |  |  | + | + | 4 |
| 12 | 1p1n/2p1n/2p2n/2p4n | 3 | - | + |  | inv. -1 | 12 | 2p1n/2p2n | 3 | - | + |  |
| 13 |  |  | - | * |  |  | 13 |  |  | - | * |  |
| 14 |  |  | + | * |  |  | 14 |  |  | + | + | 5 |
| 15 | 1p1n/1p2n/1p5n |  | - | - | 3 | 0 | 15 | 1p1n/1p2n | 4 | - | + |  |
| 16 |  |  | + | * |  |  | 16 |  |  | + | * |  |
| 17 |  |  | + | * |  |  | 17 |  |  | + | * |  |
| 18 |  | 4 | + | - |  | dir. -1 | 18 |  |  | + | + | 6 |
| 19 |  |  | + | + | 4 | 0 | 19 |  |  | + | + | 7 |
| 20 |  |  | + | + | 5 | 1 | 20 |  |  | + | + | 8 |
| 21 |  |  | - | * |  |  | 21 | 1p5n | 5 | - | + |  |
| 22 |  |  | + | + | 6 | 2 | 22 |  |  | + | * |  |
| 23 |  |  | + | + | 7 | 3 | 23 |  |  | + | + | 9 |
| 24 | 1p1n/2p4n/2p2n/2p1n | 5 | - | + |  | 2 | 24 | 2p1n/2p2n | 6 | - | + |  |
| 25 |  |  | + | * |  |  | 25 |  |  | + | * |  |
| 26 |  |  | + | * |  |  | 26 |  |  | + | + | 10 |
| 27 |  |  | + | * |  |  | 27 |  |  | + | * |  |
| 28 | 1p1n/3p1n/3p3n/3p2n | 6 | - | + |  | 1 | 28 | 3p1n/3p2n/3p3n | 7 | - | + |  |
| 29 |  |  | + | * |  |  | 29 |  |  | + | * |  |
| 30 |  |  | - | * |  |  | 30 | 1p1n | 8 | - | + |  |
| 31 | 1p5n/1p2n/2p2n/4p2n | 7 | - | + |  | inv. 0 | 31 |  |  | - | * |  |
| 32 |  |  | - | * |  |  | 32 |  |  | - | - | 11 |
| 33 | 1p1n/1p3n/3p3n/2p3n |  | + | + | 8 | 1 | 33 | 1p3n/2p3n/3p3n | 9 | + | - |  |
| 34 |  |  | - | * |  |  | 34 |  |  | - | * |  |
| 35 |  |  | - | * |  |  | 35 |  |  | - | - | 12 |
| 36 | 1p1n/1p2n/2p2n/2p4n |  | + | + | 9 | 2 | 36 | 1p2n/2p2n | 10 | + | - |  |
| 37 |  |  | + | * |  |  | 37 |  |  | + | * |  |
| 38 |  |  | - | * |  |  | 38 |  |  | - | * |  |
| 39 | 1p1n/2p1n/ |  | + | + | 10 | 3 | 39 | 1p1n/2p1n/2p2n | 11 | + | - |  |
| 40 |  |  | - | * |  |  | 40 |  |  | - | * |  |
| 41 |  |  | + | * |  |  | 41 |  |  | + | * |  |
| 42 |  | 8 | - | + |  | dir. 2 | 42 |  |  | - | - | 13 |
| 43 |  |  | + | + | 11 |  | 43 |  |  | + | + | 14 |
| 44 |  |  | - | - | 12 |  | 44 |  |  | - | - | 15 |
| 45 | 2p2n/1p2n/1p5n | 10 | - | + |  | 2 | 45 | 1p2n/2p2n | 12 | - | + |  |
| 46 |  |  | + | * |  |  | 46 |  |  | + | * |  |
| 47 |  |  | - | * |  |  | 47 |  |  | - | * |  |
| 48 |  |  | - |  | 13 | 3 | 48 |  |  | - | - | 16 |
| 49 |  |  | + | + | 14 | 4 | 49 |  |  | + | + | 17 |
| 50 |  |  | - | - | 15 | 5 | 50 |  |  | - | - | 18 |
| 51 |  | 11 | + | - |  | 4 | 51 |  | 13 | + | - |  |

FIG. 4

| Date | spread | mov avg | X1 | X2 | X3 | X4 | X5 | X6 |
|---|---|---|---|---|---|---|---|---|
| 1/4/93 | 1.875 | | + | | | | | |
| 1/5/93 | 1.5 | | + | | | | | |
| 1/6/93 | 2 | 1.79167 | + | + | + | + | | |
| 1/7/93 | 2 | 1.83333 | + | + | + | + | | |
| 1/8/93 | 1 | 1.66667 | + | + | + | + | | |
| 1/11/93 | 1.625 | 1.54167 | + | + | + | + | | |
| 1/12/93 | 2.125 | 1.58333 | + | + | + | + | | |
| 1/13/93 | 1.5 | 1.75 | + | + | + | + | | |
| 1/14/93 | 1.75 | 1.79167 | + | + | + | + | | |
| 1/15/93 | 1.25 | 1.5 | + | + | + | + | | |
| 1/18/93 | 1.5 | 1.5 | + | + | + | + | | |
| 1/19/93 | 3.625 | 2.125 | + | + | + | + | + | |
| 1/20/93 | 1.625 | 2.25 | + | + | + | + | + | |
| 1/21/93 | 1.125 | 2.125 | + | + | + | + | + | |
| 1/22/93 | 2.25 | 1.66667 | + | + | + | + | | |
| 1/25/93 | 1.75 | 1.70833 | + | + | + | + | + | |
| 1/26/93 | 4.5 | 2.83333 | + | + | + | + | + | + |
| 1/27/93 | 1.75 | 2.66667 | + | + | + | + | + | + |
| 1/28/93 | 1.125 | 2.45833 | + | + | + | + | + | |
| 1/29/93 | 0.75 | 1.20833 | + | + | + | + | | |
| 2/1/93 | 0.625 | 0.83333 | + | + | + | | | |
| 2/2/93 | 1 | 0.79167 | + | + | + | | | |
| 2/3/93 | 1.875 | 1.16667 | + | + | + | + | | |
| 2/4/93 | 1.125 | 1.33333 | + | + | + | + | | |
| 2/5/93 | 1 | 1.33333 | + | + | + | + | | |
| 2/8/93 | 1 | 1.04167 | + | + | + | | | |
| 2/9/93 | 1.625 | 1.20833 | + | + | + | | | |
| 2/10/93 | 2.25 | 1.625 | + | + | + | + | | |
| 2/11/93 | 1.375 | 1.75 | + | + | + | + | | |
| 2/12/93 | 1.125 | 1.58333 | + | + | + | + | | |
| 2/16/93 | 2.125 | 1.54167 | + | + | + | + | | |
| 2/17/93 | 1 | 1.41667 | + | + | + | | | |
| 2/18/93 | 1.5 | 1.54167 | + | + | + | + | | |
| 2/19/93 | 0.75 | 1.08333 | + | + | + | | | |
| 2/22/93 | 0.875 | 1.04167 | + | + | | | | |
| 2/23/93 | 1 | 0.875 | + | | | | | |
| 2/24/93 | 1 | 0.95833 | + | | | | | |
| 2/25/93 | 2.25 | 1.41667 | + | + | + | | | |
| 2/26/93 | 1.5 | 1.58333 | + | + | + | + | | |
| 3/1/93 | 0.875 | 1.54167 | + | + | + | + | | |
| 3/2/93 | 0.875 | 1.08333 | + | + | + | | | |
| 3/3/93 | 1.875 | 1.20833 | + | + | + | | | |
| 3/4/93 | 0.75 | 1.16667 | + | + | + | | | |
| 3/5/93 | 1.125 | 1.25 | + | + | + | | | |
| 3/8/93 | 1 | 0.95833 | + | + | | | | |
| 3/9/93 | 0.75 | 0.95833 | + | + | + | | | |
| 3/10/93 | 2.125 | 1.29167 | + | + | + | + | | |
| 3/11/93 | 1.125 | 1.33333 | + | + | + | + | | |
| 3/12/93 | 2.125 | 1.79167 | + | + | + | + | | |
| 3/15/93 | 1.25 | 1.5 | + | + | + | + | | |
| 3/16/93 | 0.5 | 1.29167 | + | + | + | | | |
| 3/17/93 | 1.5 | 1.08333 | + | + | + | | | |
| 3/18/93 | 0.5 | 0.83333 | + | + | | | | |
| 3/19/93 | 0.875 | 0.95833 | + | + | + | | | |
| 3/22/93 | 1 | 0.79167 | + | + | | | | |
| 3/23/93 | 1.375 | 1.08333 | + | + | + | | | |
| 3/24/93 | 2.875 | 1.75 | + | + | + | + | | |
| 3/25/93 | 0.75 | 1.66667 | + | + | + | + | | |
| 3/26/93 | 1 | 1.54167 | + | + | + | + | | |
| 3/29/93 | 1.125 | 0.95833 | + | + | + | | | |
| 3/30/93 | 2.125 | 1.41667 | + | + | + | + | | |
| 3/31/93 | 1.375 | 1.54167 | + | + | + | + | | |
| 4/1/93 | 0.75 | 1.41667 | + | + | + | | | |
| 4/2/93 | 1.375 | 1.16667 | + | + | + | + | | |
| 4/5/93 | 1.375 | 1.16667 | + | + | + | + | | |
| 4/6/93 | 0.875 | 1.20833 | + | + | + | | | |
| 4/7/93 | 1.375 | 1.20833 | + | + | + | + | | |
| 4/8/93 | 2.125 | 1.45833 | + | + | + | + | | |
| 4/12/93 | 1.25 | 1.58333 | + | + | + | + | | |

METHOD FOR A SEQUENTIAL PREDICTION OF BINARY ELEMENT'S STATE IN A BINARY PROCESS AND THE SYSTEM FOR THE METHOD IMPLEMENTATION

BACKGROUND OF THE INVENTION

1. Field of the Invention

The present invention relates to methods and systems of prediction. The main object of the present invention is an extension of cognitive predicting methods on non-stationary processes.

2. The Prior Art

Every process can be viewed as a product of some entity's functioning. From that position, we may look at the process as the entity's output. We also may use the term object of prediction meaning the entity whose output shall be predicted. The binary process is frequently used for a representation of any other process that permits such mapping. All further descriptions will be done in view of the binary process prediction.

The majority of known methods, algorithms, and systems, which are capable of prediction of the entity's output, use a priori knowledge of that entity's properties. Typically, the entity's properties are described in the form of various types of mathematical models such as sets of algebraic, differential, integral, stochastic equations, and their combinations. The predicting systems that employ the entity's model span the wide range between the first attempts for extrapolation by Newton, Lagrange, etc. [G. A. Korn, 1961], and modern adaptive predictors [U.S. Pat. No. 5,424,942, 07/1995, 364#164, Dong,]. The degree of complexity of prediction rises continuously. The development of cognitive predicting algorithms was inspired by a problem of an accurate prediction for an entity that is not able to provide complete information about its varying parameters and structure. These algorithms use cloning of evolutionary principals of biological systems. They belong to a set of genetic algorithms whose theory Dr. J. Holland developed in 1975. There are important features that describe uniqueness of the predicting systems utilizing a genetic algorithm approach [J. Holland, 1975, J. R. Koza, 1992, U.S. Pat. No. 5,136,686, 08/1992, Koza, K. De Jong and W. Spears, 1993]:

- Object of prediction is stationary or quasi-stationary
- The process to be predicted, employs a binary string as its internal representation
- A Genetic Algorithm Representative Schema is a set of predicting solutions that are functions of the process' argument. Every generation of such schema is a product of a multi-step optimization procedure that includes the Natural Selection Algorithm for an appropriate selection of the predicting solutions; Evolutionary Operators such as crossover, mutation, permutation, proportional reproduction, inversion, etc., for the new solutions generation; and a Fitness Function to be a measure of performance for each of those solutions
- The representative schema optimization procedure acts on the specified interval of the binary process history to train the predicting system in recognizing of specifics of the process that is subjected to prediction
- The predicting system produces a prediction of the forthcoming process element via calculating an output of the optimal predicting function at the next value of its argument.

A powerful extended genetic algorithm developed by J. Koza [U.S. Pat. No. 5,136,686, 08/1992] is a good material for a discussion of strengths and weaknesses of the genetic algorithm approach in the context of non-stationary process prediction. The J. Koza's genetic algorithm is nonlinear. It not only includes the natural selection method and evolutionary operators, but also breaks down a problem into a hierarchy of subordinating sub-problems. This algorithm is free of the uniformity constraint that requires keeping the same size for all members of the population of predicting solutions. The J. Koza's genetic algorithm was not specifically designed for prediction. In the most general form given in the patent disclosure, this algorithm has the following description. "The process of the present invention operates upon a population of entities which accomplish tasks and can vary in size and shape. Each iteration of the process comprises activating, selecting, choosing, performing, and adding. First, each entity activates to accomplish its goal and produces a result. Second, a value is associated with the result of each activation and assigned to the corresponding entity. Third, at least one entity having a relatively high associated value is selected. Next, an operation is chosen from crossover, fitness proportionate reproduction, mutation, or permutation. If crossover is chosen, then the selected entity performs the crossover operation. Crossover creates new entities by combining portions of at least one selected entity with portions of at least one another entity. Fitness proportionate reproduction retains the selected entity in the population. Mutation randomly alters a small random part of an entity. Permutation reorders the parts of an entity without a net gain or loss. Finally, the newly produced entities are added to the population.

"Many seemingly different problems can be reformulated into a problem requiring discovery of mathematical expression or computer program that produces some desired output for particular inputs. When viewed in this way, the process of solving these seemingly different problems becomes equivalent to searching a space of possible mathematical expressions or computer programs for a most fit individual mathematical expression or computer program." Naturally, Dr. Koza suggested to use this algorithm for prediction of ". . . the future elements of a sequence of numbers from a sampling of early numbers from the sequence [U.S. Pat. No. 5,136,686, 08/1992, p. 221]."

A possible binary process element predicting system that corresponds to the described above genetic algorithm may be presented with a block diagram depicted on the FIG. 1. The following conventions are present in the above illustration.

| | |
|---|---|
| H | Binary Process Storage |
| PFG | Predicting Functions Generator |
| F | Predictor |
| $\Phi$ | Fitness Function Operator |
| $x(\tau)$ | binary process; $\tau = (t_1, t_2, \ldots, t_p)$ - discrete argument; |
| $h[x(\tau), t_q, t_r]$ | Binary string of the binary process history; |
| PF | Set of predicting functions |
| $pf_{opt}(\tau, t_q, t_r)$ | optimal predicting function |
| $f(\tau) = f(t_{i+i})$ | the state of an $i + 1$ element in the binary process prediction; $i < p$ - retrospective prediction; |
| $i \geq p$ | actual prediction |

There are two types of predicting procedures in the system. The first procedure is an actual predicting procedure. The second procedure is a retrospective predicting procedure. An operator F that has the following definition provides both procedures.

$$\forall \tau=(t_1,t_2,\ldots,t_p), \tau=t_i \Rightarrow F[x(\tau)] \equiv f(t_{i-1}) \quad (1.1)$$
$$f(t_{i+1})=x(t_{i+1}) \Rightarrow \text{"correct prediction"}$$
$$t_i=t_p \Rightarrow f(t_{i+1})-\text{actual prediction}$$
$$t_i<t_p \Rightarrow f(t_{i-1})-\text{retrospective prediction}$$

Here $t_p$ is a value of the latest existing discrete argument $\tau=(t_1, t_2, \ldots, t_p)$ of the binary process $x(\tau)$. When the retrospective predicting procedure is active, it is assumed that the forthcoming element of the binary process is unknown. This procedure is used at the stage of genetic algorithm representative schema optimization. When the actual predicting procedure is active, it means that the forthcoming element of the binary process is really unknown. The discrete argument $\tau$ of the binary process $x(\tau)$ is not necessarily a time variable.

The binary process predicting system that is based on the described above genetic algorithm operates as follows. Each element of the binary process $x(\tau)$ goes to the storage (H) where it becomes a binary string $h[x(\tau),t_i]$ element; $t_i$ is an observer's position point, $i=1,2,\ldots,p$. The system selects an interval $[t_q,t_r]$, $t_q<t_r \leq t_p$ on that binary string. Then, the Predicting Functions Generator (PFG) inserts an initial population of the binary process' predicting functions $pf_k$ $(\tau,t_q,t_r) \in PF_1$, $k=1,2,\ldots,K$. Each predicting function is made up of binary tokens, and may be considered as a chromosome. Then, the predicting system initiates training until it finds the optimal predicting function $pf_{opt}(\tau,t_q,t_r)$, $\tau \in [t_q,t_r]$. The following recursive expressions give a formal description of a search for the optimal predicting function.

$$PF_{j-1}=PFG[PF_j,\phi_j(\tau)], j=1,2,\ldots,J \quad (1.2)$$

(An iteration index j is omitted further in order to simplify notations)

$$\forall \tau=(t_1,t_2,\ldots,t_p), \tau=t_i \Rightarrow F[x(\tau)] \equiv f(t_{i+1})$$

$$\phi(\tau,t_q,t_r)=\Phi[R(\tau),W(\tau)]=\Sigma[R(\tau)]\Sigma^{-1}[W(\tau)], \phi(\tau,t_q,t_r) \geq 0$$

$$R(\tau)=\{R_1(\tau),R_2(\tau),\ldots,R_N(\tau)\}, W(\tau)=\{W_1(\tau),W_2(\tau),\ldots,W_N(\tau)\}$$

$$\exists pf_{opt}(\tau,t_q,t_r) \in PF, \phi(\tau) \rightarrow max(\text{perfect fit})$$

$$\exists pf_m(\tau,t_q,t_r) \in PF, \phi(\tau)-\phi^o>0, \phi^o>0, m=1,2,\ldots,M(\text{good fit})$$
$$f(t_{i+1})=x(t_{i+1}) \Rightarrow R_i(\tau)=1-\text{correct prediction}$$
$$f(t_{i+1}) \neq x(t_{i-1}) \Rightarrow R_i(\tau)=0-\text{incorrect prediction}, i=1,2,\ldots,N$$

$$W_i(\tau)=\neg R_i(\tau)$$

The fitness operator $\Phi$ of the (1.2) may have a different view. However, every fitness function shares a common feature. Each fitness function in the predicting system provides an integral evaluation of the system's predicting ability. This evaluation is calculated on the interval $[t_q,t_r]$ where $(t_r-t_q) \gg 1$. The form of the fitness operator presented in the expressions (1.2) reflects the fact that the efficiency of prediction is as higher as there are more correct predictions produced with respect to the amount of incorrect predictions if both of them are observed on the same interval $[t_q, t_r]$. The number $N \equiv N_j$ of components of the vectors $R_j$ and $W_j$ is equal to the cardinal number of the $PF_j$-set for each iteration $j=1,2,\ldots,J$. The PFS - operator of the (1.2) is responsible for changes in the population of pf - functions. This operator involves evolutionary operations to modify pf - functions from the previous iteration. It also produces a selection of those pf - functions which satisfy to the "good fit" selection condition. The "good fit" pf - functions are the source of new members in the $PF_{j+1}$. Thus, we can see that the fitness function $\phi(\tau)$ serves in this predicting algorithm as a measure of how successfully any pf - function returns predictions exclusively on the interval $[t_q, t_r]$.

The described above method possesses a distinctive peculiarity of the genetic algorithms if viewed from the position of prediction. That is a utilization of the iterative optimization procedure for achieving the optimal predicting function. In this connection, the optimization procedure is defined on the certain interval of the binary process's "past" such that the search for the optimal predicting solution and the actual prediction are separated from each other.

K. De Jong and W. Spears (1993) concluded in their review on genetic algorithms, that the operational domain of the algorithm developed by J. Koza (1992) and the similar algorithms and systems [U.S. Pat. Nos. 4,697,242, 09/1987, Holland; 5,222,192, 07/1993, Shaefer; 5,255,345, 10/1993, Shaefer] are limited by a stationary state constraint. This constraint requires for every system that involves the genetic algorithm for prediction, to be stationary, or in some particular cases, to be quasi-stationary. It is possible to support Dr. De Jong's opinion with the help of the following reasoning. Let us assume that the optimal predicting function has been found as a result of training on the interval $[t_q, t_r]$. The next step is the actual prediction, when $\tau$ goes farther than the $[t_q, t_r]$. However, as long as the arbitrary fitness function is able to evaluate performance of the pf - functions only if $(t_r-t_1) \gg 1$, then a possible error in the actual prediction at $\tau=t_{r+1}$, can not affect the PF - set's membership. It is necessary to carry out several predictions using the $pf_{opt}$ $(\tau, t_q, t_r)$ before the new optimal predicting function $pf_{opt}$ $(\tau, t_s, t_{r+w})$, $w \gg 1$ can be determined and the system can use it for prediction. Therefore, that kind of predicting system may work efficiently only if such interval $[t_r, t_{r+w}]$, $w \gg 1$ exists where the binary process does not change one's properties. In other words, the object of prediction must be stationary or quasi-stationary in order for the genetic algorithm based predicting system works efficiently. The described above is a projection of the genetic algorithm's natural limitation on the problem of the binary process prediction.

This is a known fact that differential, integral, stochastic, or any other mathematical models can not entirely represent a non-stationary process. Hence, any methods based on traditional mathematical models are not feasible for non-stationary process prediction. Some of typical non-stationary processes are listed below for a purpose of illustration.

1. Signal-to-noise ratio in a discrete measuring system if at every particular moment of measuring a value of this ratio needs to be predicted
2. Sequential prediction of elements of an econometric time series
3. Game whose random outcome must be predicted at every step and the number of steps are limited
4. Prediction of an object's failure according to a pre-assigned check-up schedule.

The above listed and the like processes do not have the interval $[t_r,t_{r+w}]$, $w \gg 1$ where their steadiness or stationarity can be confirmed. Hence, it appears that a predicting system utilizing any genetic algorithm is unable to manage alteration of the non-stationary process' behavior. Moreover, there are a few fundamental features of the genetic algorithms that definitely resist the solving of the problem of non-stationary process prediction. Those features are:

Generating of new predicting functions through the application of the evolutionary operators such as crossover, mutation, proportional reproduction, etc., to the existing members of the population of predicting functions Separation of the optimal predicting function $Pf_{opt}$ ($\tau$, $t_q$, $t_r$) determination process from the process of actual prediction such that the optimal predicting function can be defined only on the antecedent interval $[t_q, t_r]$, $(t_r-t_q)\gg 1$, $t_r \leq t_p$.

In addition, the cognitive predicting system utilizing multi-step optimization for the system's training requires powerful computing sources. This is also a substantial limitation of the genetic algorithm paradigm.

At the same time, the genetic algorithms carry several significant properties that are vital for the solution of the non-stationary process prediction problem.

First, it is an idea of adaptation [J. H. Holland, 1975]. The adaptation is considered an ability of a system modifying its parameters and structure in response to changes of the system's environment. In view of the process' prediction, the role of the environment belongs to the object of prediction.

The second property is an assumption about the existence of a representative set of solutions. A desired solution or solutions may be obtained by applying the Natural Selection Algorithm to the representative set of solutions.

The third property is an idea about the existence of atomic elements (genes) whose combinations construct members (chromosomes) of the representative set of solutions (population of chromosomes).

The last of these properties is a conjecture that chromosomes of different size may exist in the same population of solutions [J. Koza, 1992].

The following questions must be answered when developing the method for a sequential prediction of a binary element's state in the binary process.

The structure and the algorithm of the predicting system that is enable to adapt to a fast altering behavior of the non-stationary object of prediction.

The predicting procedure that employs the Natural Selection Algorithm.

The generator of predicting functions and the algorithm for these functions update.

The composition, the size, and the property of the set of predicting functions

There are no answers found in scientific literature for these questions. The problem of sequential prediction of a binary element's state in a binary process finds its solution in the present invention. One object of the present invention is to provide a mathematical method and a computer algorithm to perform real time predictions of binary processes including non-stationary processes. A further object of the present invention is to provide the structure of the cognitive system for a sequential prediction of a binary element's state in a binary process that increases efficacy of functioning of any entity that includes this system as a subsystem.

SUMMARY OF THE INVENTION

The present invention relates to methods and systems of prediction. The present invention provides the method for a sequential prediction of a binary element's state in a binary process and the system for the method embodiment. The binary processes are frequently used as a representation of a wide range of other processes that can be observed at outputs of various types of objects of prediction. The present invention is based on a representation of the chaotic nature as a "neighboring" order regularity whose separate parts preserve some order. The binary process was decomposed and specific atomic binary structures of minimal length were distinguished. A propagation of those structures in both directions of the binary process domain returns a stable, regular image. Such formations were denoted as the Elementary Behavioral Functions. It is observed in the present invention that every binary process $x(\tau)$, $\tau=t_1, t_2, \ldots, t_p$ can be uniquely represented by a sequence of its elementary behavioral functions $b_k$ ($\tau$, $t_k$, $\eta_k$), ($k=1, 2, \ldots, K$), $$\forall \tau \in (t_1, t_2, \ldots, t_p), x(\tau) = \Sigma b_k(\tau, t_k, \eta_k), \eta_k \geq 2, t_k = t_{k-1} + \eta_k \quad (2.1)$$

$$\text{dom}[b_k(\tau, t_k, \eta_k)] = [t_{k-1}, t_k]$$

Here $\eta_k$ is a period of the k-th elementary behavioral function; dom $[b_k(\tau,t_k,\eta_k)]$ is a domain of the function $b_k(\tau,t_k,\eta_k)$ [R. Elmasri and S. Navathe, 1994]. If taken with satisfaction to a condition of orthogonality, these functions become behavioral genes of the binary process, and constitute a genotype BG of the binary process' behaviors. The behavioral genotype set is defined on a representative interval $[t_q, t_r]$, $\lambda=(t_r-t_q)\gg 1$. Then, the set BG is transformed into a generalized genotype BG* by a union with the set $C=\{c^+(\tau), c^-(\tau)\}$. Each member of the C-set is a countable sequence of identical states of binary process elements under the condition of $c^+(\tau) = \neg\ c^-(\tau)$.

It is stated in the present invention that the genotype BG* is quasi-stationary relatively to a character of change of two adherent elementary behavioral functions in the expression (2.1). Every binary process has its inherent behavioral genotype. In the case of a multi-dimensional system each component $x(\tau)$ of a vectorial binary process $X(\tau)$ has its inherent behavioral genotype.

The process of prediction is recursive. It includes the following basic steps.

1. Determination of the set $BG^*_j$ of behavioral genes at the moment $\tau=t_r$. The set $BG^*_j$ modifies the previous set $BG^*_{j-1}$ which was determined at $\tau=t_{r-\lambda j}$, $\lambda_j \in N$, where N denotes the set of natural numbers. If $\tau \in [t_{r-\lambda j}, t_r)$ then the set $BG^*_{j-1}$ is still active.

2. Evaluation of the binary process instability level, or process' transients effect on process' predictability, through a calculation of an estimating vector-function $\phi_j=\{\phi_{1j}(\tau,t_e,\lambda_{e1}),\phi_{2j}(\tau,t_e,\lambda_{e2}), \ldots, \phi_{nj}(\tau,t_e,\lambda_{en})\}$ by applying a retrospective predicting procedure; $t_e$-evaluation schedule indicator; $\lambda_e$-evaluation window 3. Performing an actual dual-stage predicting procedure at $\tau=t_p \geq t_r$. This procedure produces a prediction of a forthcoming binary element's state $x(t_{p+1})$ in the binary process $X(\tau)$. The procedure is non-iterative and cyclic. Each cycle may contain several predictions. The starting point ($t_c$) for the next cycle is when an error er ($t_c$) of prediction occurs, i.e., $\exists t_c \in \tau$, $f(t_c) \equiv f(t_{p+1}) \neq x(t_{p+1}) \Rightarrow \text{er}(t_c)=\text{true}$, ($t_c=t_{c1}, t_{c2}, t_{c3}, \ldots$). The first stage is for a selection of the set $PF_k=PFS [BG^*_j, \cup (\phi_k)]$, ($k=1,2,\ldots$) of predicting functions, which are active at the beginning of the k-th cycle of prediction. The $PF_k$- set exists in various alternate versions. The composition of this set is controlled by a function ™ ($\phi_k$). This function is responsive to the current level of the binary process instability. It is fulfilled in the present invention that a cardinality of the set of predicting functions is inversely related to the evaluated instability level of the binary process; so that, for explicitly non-stationary processes the following statement is competent: $PF_k \subset BG^*_j$. The second stage is for prediction directly. The prediction $f(\tau) \equiv f(t_{p+1})$ is returned by a logical operator F acting upon the set $PF_k$ of predicting functions. The output of the prediction $f(\tau)$ depends on prediction error's status of each $PF_k$-set's member, current efficiency of prediction, and a set of binary indicators modifying a predicting algorithm. The retrospective prediction and the actual prediction both employ the Natural Selection Algorithm in a manner that each member of $PF_k$ participates in the current prediction cycle until this member produces an incorrect prediction. Each predicting function may again participate in prediction only in the next predicting cycle.

4. Updating of the behavioral genotype membership and re-estimating of the binary process instability level.

The above-presented method of prediction is used in a predicting system that is the method's embodiment. The system is comprised of two subsystems—subsystem $SS_1$, and subsystem $SS_2$. The main objective of the subsystem $SS_1$ is the determination of a composition of the behavioral genotype set. The $SS_1$-subsystem provides such determination on periodical basis. The subsystem $SS_1$ is comprised of the following: a Binary Process Mapping Block (BM), a Binary Process History Storage Block (H), a Behavioral Genotype Creator (BG), a Sampling Block (S), and a Binary Process Shortest History Storage Block (HS). The BM block quantifies, if it is necessary, the signal u(t) from an output of the object of prediction. The quantification may be performed by time and/or by level of the input signal. In total, the output of the BM-block is a vector-function $x(\tau)$ of the discrete argument $\tau=(t_1,t_2,t_3, \ldots, t_p)$, where $t_p$ is the latest observed value of $\tau$. Every component of $x(\tau)$ is processed by a separate identical tract in the $SS_1$, and then the processed data from that tract come to a corresponding tract in the $SS_2$. In order to simplify a disclosure, all descriptions will be further provided for a single component $x(\tau) \in x(\tau)$. A block diagram of the one-dimensional predicting system is shown in FIG. 6. The following conventions are present in the above illustration:

| | |
|---|---|
| $SS_1$ | Subsystem #1 |
| BM | Binary Process Transforming Block |
| H | Binary Process History Storage Block |
| BG | Behavioral Genotype Creator |
| S | Sampling Block |
| HS | Binary Process Shortest History Storage Block |
| $SS_2$ | Subsystem #2 |
| $F_v$ | prediction Block, v = 1, 2, . . . , n |
| $E_v$ | Binary Process Instability Estimator, v = 1, 2, . . . , n |
| u(t) | Output of an Object of Prediction |
| $x(\tau)$ | Binary Process |
| $f(\tau)$ | Prediction, $\tau = (t_1, t_2, t_3, \ldots, t_p, t_{p+1})$ |

The H-block memorizes each sequential element of the process $x(\tau)$ that comes from the BM-block, and forms a binary string $[x(\tau),t_q,t_p] \equiv h[x(\tau)]$. The string $h[x(\tau)]$ goes to an input of the BG-block and to an input of the HS-block. The latter creates a binary string $hs[x(\tau),t_s,t_p] \equiv hs[x(\tau)]$, $s \leq q$. The BG-block makes a decomposition (2.1) of the string $h[x(\tau)]$ on the interval $[t_{(r-\lambda j)}, t_r]$, $t_r \leq t_p$. The ordering number j of the sample's length $\lambda_j$ is linked to the value $t_r$ when the decomposition has been initiated. The Sampling Block in the $SS_1$-subsystem's local feedback controls the value of the $\lambda_j$ according to a criterion of statistical stability (e.g., the stability of the arithmetic average or both the arithmetic average and the standard deviation) of the biggest elementary behavioral function's period $\eta^{max}(t_r,\lambda_j) \equiv \eta_j^{max}$ taken from the sample. The $\eta_j^{max}$ variable defines a cardinal number of the $BG_j$-set. Any methods of statistical analysis are allowed at this stage. A human operator may also set up the value $\lambda_j$. The BG - block generates members of the $BG^*_j$-set. The j-index in the behavioral genotype notation points to the fact that this set is going to be updated according to some schedule. The BG*-set's composition data is a main output of the subsystem $SS_1$. Information about the BG*-set membership comes to an input of each Selector of Predicting Functions of the subsystem $SS_2$. The binary string $hs[x(\tau),t_s,t_p]$ goes from an output of the HS-block to another input of the PFS-block of the $SS_2$. The BG-block receives a feedback signal from the $SS_2$. This signal controls the schedule for updating the BG*-set.

The main objective of the subsystem $SS_2$ is selecting the set of predicting functions from the BG*-set and then, performing a prediction. The subsystem $SS_2$ has some distinctive singularities:

The subsystem involves a cyclic, non-iterative, and non-optimizing method of prediction.

The subsystem employs evaluation of the binary process instability. This evaluation is performed for selection of an appropriate set of predicting functions at the initial moment of a predicting cycle.

The subsystem insures that the cardinality of the set of predicting functions is inversely related to the evaluated binary process instability level so that, for the explicitly non-stationary processes $PF_k \subseteq BG^*_j$.

The $SS_2$ subsystem is built from Selectors of Predicting functions ($PFS_i$), Prediction Blocks ($P_i$), and Binary Process Instability Estimators ($E_i$), i=1, 2, . . . , m. The subsystem $SS_2$ is comprised of two contours. The first contour is the main contour of the $SS_2$. This contour includes a tract PFS→P that is responsible for the selection of the set $PF_k \equiv PF(t_{ck})=PF(BG^*_j)$ of predicting functions. These functions are only active in the current predicting cycle. The $PF_k$-set is an output of the PFS-block. The actual prediction $f(\tau)$ is the first output of the P-block of the same contour.

The second contour evaluates the binary process instability level. The second contour is comprised of several parallel channels. These channels have an identical structure such as $PFS_i \rightarrow P_i \rightarrow E_i$. Each channel generates a respective component of the estimating vector-function $\phi(\tau, t_e, \lambda_e)$. The evaluation is performed the application of the retrospective predicting procedure to some interval $[t_q,t_r]$, $t_r \leq t_p$ of the binary process history. Here, $t_e$ is an evaluation schedule point, and $\lambda_e=(t_q-t_r)$ denotes the length of the evaluation window.

The second output of the P-block of the main contour is an indicator $er(\tau)$ of the error of prediction. This indicator signals to the exterior of the $SS_2$-subsystem about the end of the current cycle of actual prediction. The BG-block of the $SS_1$-subsystem takes into account the state of such "End-of-Cycle" indicator and uses this information for scheduling of the next update of the BG*-set. The er ($\tau$) signal is also used by the $SS_2$ to perform the next instability evaluation of the binary process. A link between the P-block of the $SS_2$-subsystem and the BG-block of the $SS_2$-subsystem closes the global feedback in the predicting system. Depending on the system's embodiment, a human operator of the predicting system may update the schedules, as well as the setup parameters for the binary process decomposition and subsequent statistical analysis of the elementary behavioral functions.

Predictions performed during a predicting cycle are independent of the evaluation procedure. Each of the three main procedures in the system (the determination of the behavioral genotype, the evaluation of the binary process instability, or process' transients effect on predictability, and the selection of the set of predicting functions, which are active in the current predicting cycle) can be performed independently and do not affect the system's speed.

The described above method of prediction increases the efficiency of the binary process prediction. This method extends the applicability of cognitive predicting systems in the field of non-stationary processes. The principal advantage of the method is a more intensive use of the "present" and the "nearest past" area in the binary process domain. Contrary to prior art's solutions, the present invention does not demand in the zone $[t_p, t_{p+w}]$, (w>>1) of the guaranteed binary process stability. The iterative optimizing "Errors and Trials" genetic algorithm is also absent in the predicting procedure of the present invention. This fact makes possible the application of the present invention to a population of real-time systems.

The present invention can be incorporated in any system that permits mapping of at least one of that system's output on the space of binary processes.

DESCRIPTION OF THE DRAWINGS

FIG. 3 illustrates the prediction by the PF-set=BG-set, #(BG)=15.

FIG. 4 presents the examples of the Embodiment 1 and the Embodiment 2 of the predicting algorithm of the present invention.

FIG. 12 illustrates the mapping of the econometric time series SPREAD on the space of binary processes.

FIG. 13 illustrates the prediction of the econometric time series SPREAD elements.

DETDESC:

DETAILED DESCRIPTION OF THE INVENTION

The present invention describes the method for a sequential prediction of a binary element's state in a binary process and the system for this method embodiment. In the following description, numerous specific details are set forth in order to prove a thorough understanding of the present invention. Mathematical notations is also frequently used to keep the description as accurate as possible. It will be obvious, however, to one skilled in the art that the present invention may be practiced without using these specific details. In other instances, well-known methods, structures, and representations have not been described in detail so as not to unnecessarily obscure the present invention.

Figure 2:
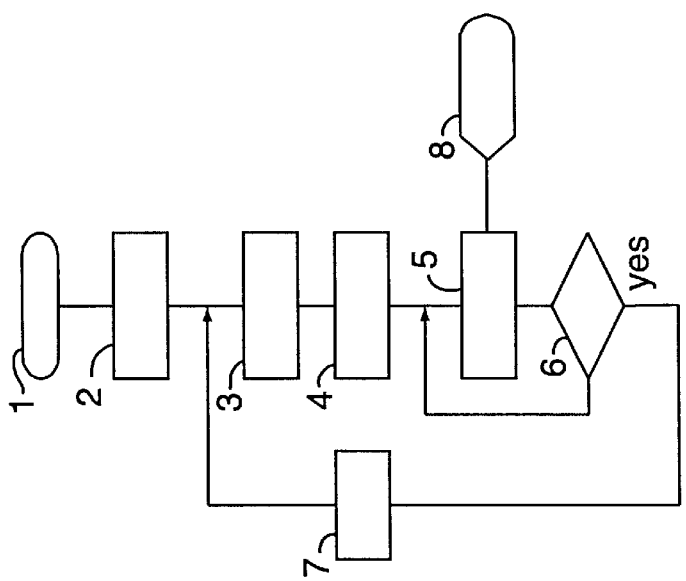
FIG. 2 is the generalized algorithm of the method for a sequential prediction of a binary element's state in a binary process.
Figure 1:
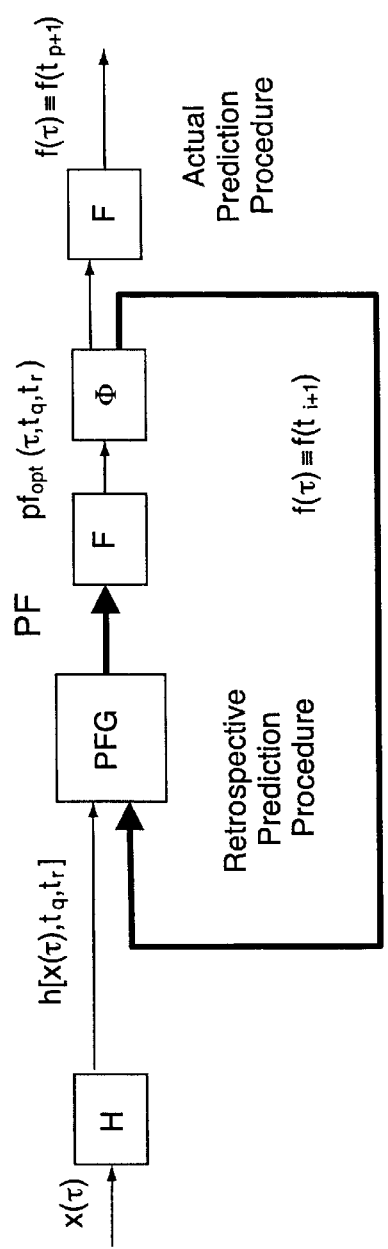
FIG. 1 depicts the block diagram of a modern predicting system based on the genetic algorithm approach.

The generalized algorithm of the new method of prediction of a binary process element's state is shown in the FIG. 2. The following conventions are present in the above illustration.

Block 1: Begin

Block 2: $\tau:t_r$

Block 3: Determination of the set $BG^*_j$ of the behavioral genes at the $\tau=t_r$ Block 4: Evaluation of the binary process instability Level or process' transients effect on predictability Block 5: Performing of the two-stage actual prediction procedure at the $\tau=t_p \geq t_r$ Block 6: Updating of the behavioral genotype membership and re-estimating of the binary process instability level Block 7: $\tau:=t_{r+\lambda(j+1)}$ Block 8: Output The method of prediction is recursive. It includes the following basic steps that must be fulfilled for every single binary process or for each component of a vectorial binary process.

1. Determination of the set $BG^*_j$ of behavioral genes at the moment $\tau=t_r$. The set $BG^*_j$ modifies the previous set $BG^*_{j-1}$ which was determined at $\tau=t_{r-\lambda j}$, $\lambda_j$=var. If $\tau\epsilon[t_{r-\lambda j}, t_r)$ then the set $BG^*_{j-1}$ is still active.

2. Evaluation of the binary process instability level through a calculation of an estimating vector-function $\phi_j=\{\phi_{1j}(\tau,t_e,\lambda_e), \phi_{2j}(\tau,t_e,\lambda_e), \ldots, \phi_{nj}(\tau,t_e,\lambda_e)\}$ by applying of the retrospective predicting procedure; $t_e$ - evaluation schedule point; $\lambda_e$ - evaluation window.

3. Performing of a two-stage actual predicting procedure at the $\tau=t_p \geq t_r$. This procedure produces a prediction of a forthcoming binary element's state $x(t_{p+1})$ in the binary process $x(\tau)$. The procedure is non-iterative and cyclic. Each cycle may contain several predictions.

4. Updating of the behavioral genotype membership and re-estimating of the binary process instability level.

All these steps are described below in detail.

Determination of the set $BG^*_j$ of behavioral genes

The corner stone of the present invention is a concept of a binary process behavioral genotype. A definition of the behavioral genotype is based on a representation of the chaotic nature in the form of a "neighboring order" regularity whose separate parts preserve some order. This assumption allows a decomposition of the binary process into specific atomic binary structures of a minimal length. A propagation of those structures in both directions of the binary process' discrete argument domain returns a stable, regular image. Such formations have been denoted as the elementary behavioral functions. It is observed in the present invention that every binary process $x(\tau)$, $\tau=t_3, t_2, \ldots, t_p$ can be uniquely represented by a sequence of its elementary behavioral functions $$\forall \tau\epsilon(t_1,t_2,\ldots,t_p), x(\tau)=\Sigma b_k(\tau,t_k,\eta_k), \eta_k \geq 2, t_k=t_{k-1}+\eta_k \quad (3.1)$$

$$dom[b_k(\tau,t_k,\eta_k)]\models[t_{k-1},t_k]$$

Here $\eta_k$ is the elementary behavioral function's period; $dom[b_k(\tau, t_k, \eta_k)]$ is a domain of the function $b_k(\tau,t_k,\eta_k)$ [R.

Elmasri and S. Navathe, 1994]. If taken with satisfaction to an orthogonality condition, these functions become behavioral genes of the binary process and constitute a genotype BG of the binary process' behaviors $$g_i \equiv g_i(\tau, \overline{\omega}_i, \eta_i) \epsilon BG \quad (3.2)$$

$$\exists i \neq j, g_i(\tau, \overline{\omega}_i, \eta_i) = \neg g_j(\tau, \overline{\omega}_j, \eta_j) \; \forall \tau \epsilon dom(x(\tau))$$

$$i=1,2,\ldots,N[\eta^{max}(t_r,\lambda)], j=1,2,\ldots,N[\eta^{max}(t_r,\lambda)]$$

$$N[\eta^{max}(t_r,\lambda)]=\#BG$$

$$\forall \eta^{max}(t_r,\lambda)=2 \Rightarrow N[\eta^{max}(t_r,\lambda)]=1$$

$$\lambda=(t_r-t_q)>0, t_r \leq t_p$$

A behavioral gene of the BG - set is a binary periodical function of a discrete argument $\tau$. Here $\eta_j$ is a period of the i-th gene, and $\overline{\omega}_i$ is its current phase; $\eta^{max}(t_r,\lambda)$ is the biggest statistically stable period among the periods of the elementary behavioral functions. The $\eta^{max}(t_r,\lambda)$ serves as a parameter of the set BG. The $\eta^{max}(t_r,\lambda)$ is determined as a result of a statistical analysis performed on the binary process decomposition (3.1). This decomposition is defined on a representative interval $[t_q,t_r]$, ($\lambda \gg 1$). Every binary process has its inherent behavioral genotype. In the case of a multi-dimensional system, each component of a vectorial binary process has its inherent behavioral genotype.

The most important fact about the set of behavioral genes is that this set is quasi-stationary relatively to a character of change of two adjacent elementary behavioral functions in the expression (3.1). Hence, the following expressions are competent.

$$x(\tau)=x(t_1),x(t_2),\ldots,x(t_p) \quad (3.3)$$

$$\forall \{x(t_i) \equiv g_j(t_i), x(t_{i+1}) \equiv g_k(t_{i+1})\} \Rightarrow P\{x(t_i),x(t_{i+1})\} \geq p_0$$

$$\forall \{x(t_i) \equiv g_j(t_i), x(t_{i+1}) \equiv b_1(t_{i+1})\} \Rightarrow P\{x(t_i),x(t_{i+1})\} < p^0$$

$$g_v \epsilon BG, v=(i,k), b_1 \epsilon BG$$

Here, $P\{x(t_i),x(t_{i+1})\}$ is a probability of the existence of two particular sequential elements $x(t_i)$, $x(t_{i+1})$ in the binary process $x(\tau)$. Consider the following fragment of the binary sequence.

Sequence $S_1$:

- +- +-- +++- +- ++++- +- ++-- +- +--- +

Here, the "+" and the "−" sign substitutes the traditional "0" and "1" language elements. We can observe 9 elementary behavioral functions in the $S_1$ accordingly with the definition (3.1). For a better visualization, the behavioral functions in the sequence $S_1$ are separated from each other with a blank space. A sum $\alpha$ of positive elements of the elementary behavioral function represents a length of its positive part. A sum $\beta$ of negative elements of the elementary behavioral function represents a length of its negative part. Hence, a variable $\eta=\alpha+\beta$ is a period of this function. The peculiarity of the BG-set is that the period of each member of this set belongs to the set of natural numbers beginning from the number 2. The following notation is used in the present invention for a member of the BG-set: $g_i \equiv (\alpha_i, \beta_i, n) \epsilon BG$, $i=1, 2,\ldots,N; N=\#(BG)$, where p corresponds to the positive part and n to the negative. Thus, the following behavioral genes constitute the sequence $S_1$.

| Behavioral Gene Code | Frequency in the Sequence $S_1$ |
|---|---|
| 1p1n | 4 |
| 1p2n | 1 |
| 1p3n | 1 |
| 2p2n | 1 |
| 3p1n | 1 |
| 4p1n | 1 |

A normal form for a behavioral gene is when the positive part is observed first. The gene's current phase $\overline{\omega}$ is the amount of elements counted on the interval between its first positive element and the element that corresponds to the value of the gene's argument designated as a point of observation (t*). For example, the gene 3p2n with the phase $\overline{\omega}=1$ has a normal view +++−−. The same gene with the phase $\overline{\omega}=2$ has a different view ++−−+. The complete mathematical description of the binary process behavioral genotype is as follows.

$$g_i(\tau,\overline{\omega}_i,\alpha_i,\beta_i,\eta_i)=He\{\alpha_i-[\tau+\overline{\omega}_i-1-\eta_i Int((d+\tau+\overline{\omega}_i-1)/\eta_i)]\}- \quad (3.4)$$

$$-He\{\beta_i-[\tau+\overline{\omega}_i-1-\alpha_{i-\eta_i}Int((d+\tau+\overline{\omega}_i-1-\alpha_i)/\eta_i)]\}$$

$$i=1,2,\ldots,N[\eta^{max}(t_r,\lambda)], N[\eta^{max}(t_r,\lambda)]=\#(BG)$$

$$\forall \eta^{max}(t_r,\lambda)>2 \Rightarrow N[\eta^{max}(t_r,\lambda)]=1+2+3+\ldots+\eta^{max}(t_r,\lambda)-1$$

$$\forall \eta^{max}(t_r,\lambda)=2 \Rightarrow N[\eta^{max}(t_r,\lambda)]=1, \lambda=(t_r-t_q)>0, t_r \leq t_p$$

$$\forall z>0 \Rightarrow He(z)=1, \forall z \leq 0 \Rightarrow He(z)(=0, z \epsilon R$$

$$d \epsilon (0,1)$$

In the expressions (3.4), He(z) is the Heaviside's Step Function; Int(z) is the Integer Function of the real argument $z \epsilon R$ [Mathcad$^{3.0}$].

The analysis of the binary process representation (3.1) and the properties of its behavioral genotype (3.3), (3.4) allows a conclusion that search for an elementary behavioral function containing a forthcoming binary process element must be performed among the members of the BG-set. It is observed in the present invention, that the probability $P\{x(t_i),x(t_{i+1})\}$ of the existence of two particular sequential elements $x(t_i)$, $x(t_{i+1})$ in the binary process $x(\tau)$ substantially increases if the BG-set transforms into a generalized genotype BG*. This increase is obtained by a union of the BG-set with the set $C=\{c^+(\tau), c^-(\tau)\}$ $$BG^*=BG \cup C \quad (3.5)$$

Each member of the C-set has the same range as the members of the BG-set. Each C-set member is a countable sequence of an identical element's state of the binary process under the condition of $c^+(\tau)=\neg c^-(\tau)$.

Identification of the behavioral genotype is a mandatory operation that executes prior to any predicting procedure. The BG-set identification can be either a stage of the predicting system design, or can be included in an algorithm of the automated predicting system.

Evaluation of the binary process instability level

Both retrospective and actual predicting procedures operate upon a set PF of predicting functions. This set is a product of a nonlinear operation PFS performed on the BG*-set. Hence, PF=PFS(BG*). For a correct selection of the PF-set members, the predicting method requires either the evaluation or the predetermination of the binary process instability level. It is maintained in the present invention that the cardinality of the set of predicting functions is inversely related to the evaluated binary process instability level; so that, for explicitly non-stationary processes it is true that PF $\subseteq$ BG*. The retrospective predicting procedure is used for this evaluation. Unlike the prior art methods where the model (1.2) of the retrospective predicting procedure is necessary for determination of the optimal predicting function, the model (1.2) in the present invention is used for the binary process instability evaluation. That procedure is incorporated in the evaluating function $\phi(\tau,t_q,t_r,PF)\equiv\phi(\tau)$. This function directly provides the quantitative information about the efficiency of prediction performed on the interval $[t_q,t_r]$, $t_r \leq t_p$. In addition, the evaluating function's output depends on the composition of the PF-set that is directly involved in prediction. Therefore, the function $\phi(\tau)$ measures how unstable the binary process was if observed before the cycle of actual predictions. During the investigation of predicting methods, the authors of the present invention discovered that the more stationary the binary process is, the better the traditional genetic algorithms perform on prediction. Thus, the evaluating vector-function $$\phi \equiv \phi(\tau)=\{\phi_1(\tau,t_e,\lambda_e),\phi_2(\tau,t_e,\lambda_e),\ldots,\phi_n(\tau,t_e,\lambda_e)\} \quad (3.6)$$

is used in the method; $t_e$ is an evaluation schedule point, and $\lambda_e=t_r-t_q$ is the length of the evaluation window. In general, the parameters $t_e$ and $\lambda_e$ may have different values for each component of the vector-function $\phi(\tau)$. A determination of the $\phi$-vector's composition is a system design task. The formulas presented below, are the embodiment that the authors of the present invention have used for the implementation of the method:

$$\forall \Sigma[W(\tau)]>0, \phi(\tau,t_q,t_r)\equiv\phi(\tau,t_e,PF)=\Phi[R(\tau),W(\tau)],t_r\leq t_{p-1} \quad (3.7)$$

$$\Phi[R(\tau),W(\tau)]=\Sigma[R(\tau)]\Sigma^{-1}[W(\tau)]$$
$$\forall \Sigma[W(\tau)]=0 \Rightarrow \phi(\tau,t_q,t_r)=\phi^o$$
$$\forall \tau=(t_1,t_2,\ldots,t_{p-1}),\tau=t_i \Rightarrow F(PF,t_i)=f(t_{i+1}) \quad (3.8)$$

$$W(\tau)=\neg R(\tau)$$
$$f(\tau)=x(\tau)\Rightarrow R(\tau)=1\text{-correct prediction}$$
$$f(\tau)\neq x(\tau)\Rightarrow R(\tau)=0\text{-incorrect prediction}$$

It follows from the (3.8) that each component of the $\phi$-vector is obtained by applying of a non-iterative retrospective predicting procedure F(PF,$\tau$). According to the definition (1.1), the retrospective predicting procedure's algorithm does not substantially differ from the algorithm for the actual predicting procedure. The difference between these algorithms includes two points. The first point is the value of the argument $\tau$ of the process $x(\tau)$ at the beginning moment of the prediction.

The second point is the retrospective predicting procedure (serving the binary process stability evaluation) employs an assignment of the PF-set's composition at the beginning of each predicting cycle. At the same time, the actual predicting procedure employs a selection of the PF-set's composition at the beginning of each predicting cycle. As an example of the possible embodiment, we propose that the first component $\phi_1(\tau,t_e)$ in the (3.6) estimates the efficiency of prediction when PF=BG*. One component of the $\phi(\tau)$ may also be the estimating function (3.7) where the PF-set is a singleton $\{pf_{opt}(\_\_,t_q,t_r)\}$. In this case, the PF-set might be a product of the prior art system (1.2). In addition, the predicting method of the present invention can as well be implemented without the involvement of the binary process instability evaluation. In that case, a designer must be aware of the expected degree of the binary process instability or non-stationarity. Therefore, the initial composition of the PF-set in the cycle of the actual predicting procedures must be predetermined.

Performing the predicting procedure

According to the definition (1.1), the predicting procedures have the following mathematical representation $$\forall \tau=(t_1,t_2,\ldots,t_p), \tau=t_i \Rightarrow F[x(\tau)]\equiv f(t_{i+1})$$
$$f(t_{i-1})=x(t_{i+1})\Rightarrow\text{"correct prediction"}$$
$$t_i=t_p \Rightarrow f(t_{i+1})\text{-actual prediction}$$
$$t_i<t_p \Rightarrow f(t_{i+1})\text{-retrospective prediction}$$

Here, $t_i$ is the beginning point of performing the prediction; $t_p$ is the latest observed value of the binary process discrete argument. For the purpose of generalization, the t* will further denote the beginning point of performing the prediction. If t*<$t_p$ then the retrospective predicting procedure is active; if t*=$t_p$ then the actual predicting procedure is active.

It was stated in the method's general description, that the procedure has a cyclic nature and includes two stages. A starting point ($t_c$) for the next $k^{th}$ cycle is when an error er($t_{ck}$) of prediction occurs, i.e., $\exists t_{ck} \equiv t^* \in \tau$, $f(t_{ck+1})\neq X(t_{ck+1})$ $\Rightarrow$ er ($t_{ck}$) =true. The first stage is for selection of the set $PF_k$=PFS[BG*$_j$,$\upsilon(\phi_k)$,$\tau$=$t_{ck}$], (k=1,2,...) of active in the $k^{th}$ cycle predicting functions $pf_{l,k}(\tau,\overline{\omega}_1,\eta_{1,k})\in PF_k$. Here, $\overline{\omega}_1$ is the current phase, (l=1, 2, ..., $I_k$), $I_k$=#($PF_k$), (j=1, 2, ...). The $PF_k$-set exists in multiple alternate versions, so that $PF_k \subset$ PFS(BG*$_j$). The composition of the $PF_k$-set is controlled by a function $\upsilon(\phi_k)$. This function is responsible for the analysis of the current stability evaluation data. The selection law is as follows $$\exists \upsilon(\phi_k)\equiv\upsilon_k^m=MAX(\phi_{k,1},\phi_{k,2},\ldots,\phi_{k,n}),\phi_{k,i}\geq 0,(i=1,2,\ldots,n) \quad (3.9)$$
$$\forall PF_{k,i}\subset PFS(BG*_j),\upsilon_k^m=\phi_{k,i}\Rightarrow PF_k=PF_{k,i}$$

The MAX - function here is the relational algebra aggregate function returning a maximum value from a sequence of values [R. Elmasri and S. Navathe, 1994]. The proposed selection law allows a predetermination of the set $PF_k$ by requiring $\phi_{k,i}>\phi^o$. The following rule controls the PF-set selection if the process $x(\tau)$ is explicitly non-stationary:

$$\exists \upsilon_k^m=\phi_{k,g}(PF_{k,g}=BG*_j)\Rightarrow PF_{k,g}\equiv PF_k=\sigma_{<condition(k,g)>}(BG*_j) \quad (3.10)$$

Here, the symbol $\sigma_{<condition>}(\ )$ denotes a relational algebra operator "SELECT" [R. Elmasri and S. Navathe, 1994]. An interval $\Delta\tau=[t_{(c-\lambda')},t_c]$, ($\lambda' \leq \lambda$, $t_c$ - the starting point of the $k^{th}$ cycle of predictions), is a space marked on the binary process history for the determination of the PF-set elements. This interval must cover at least one elementary behavioral function in the binary process decomposition (3.1). The selection condition includes a common part and a specific part. The common part is that $$PF_k \subseteq BG*_j, I_k \leq N_j, I_k=\#(pF_k), N_j=\#(BG*_j) \quad (3.11)$$
$$\forall pf_i(\tau,\overline{\omega}_i,\eta_i)\in PF_k,\tau=t_{ck}\Rightarrow pf_1(\tau,\overline{\omega}_1,\eta_1)=x(t_{ck}) \quad (3.12)$$

$$\forall l=(1,2,\ldots,I_k), t_{ck}\equiv t^*$$
$$\exists t_{ck}\in\tau, \tau=t_{ck}\Rightarrow er(t_{ck})=\text{true}$$

The property (3.11) points at the fact that each predicting function used for a non-stationary process prediction belongs to this process' behavioral genotype. The property (3.12) declares that at the beginning ($\tau$=$t_c$) of the predicting cycle, the state of each predicting function is the same as the state of the binary process' element $x(t_c)$.

The specific part of the PF-set selection condition depends on the peculiarities of the object of prediction. A determination of this specific part is a system design task. The authors of the present invention have found effective the following embodiments of the specific part of the PF-set selection condition for non-stationary binary processes.

The Embodiment 1.

1. The set $C=\{c^+,c^-\}$ always belongs to the PF-set. 2. In addition, the PF-set includes each element $g_i$ of the BG*-set that can be selected on the binary process historical interval $\Delta\tau$ and:

Whose period $\eta_i$ is equal to the parameter $\eta^{max}$ of the BG*-set. Such predicting function is called the Senior Predicting Function That can be distinguished as a completed elementary behavioral function, i.e., $\exists\eta$, $\tau\in\Delta\tau\Rightarrow b$ $(\tau, \eta)=g_i$. Such predicting function is called the Explicit Predicting Function If any explicit predicting function can be described by a code $(\alpha p \beta n)$ where $\alpha=(2,3)$ and/or $\beta=(2,3)$, then all other predicting functions with such combination of $\alpha$ and $\beta$ are added to the initial one and all of them belong to the PF-set. Such predicting function is called respectively the Pair Predicting Function, or the Triple Predicting Function. Therefore, for any binary element's state denoted by s, it is true that $(1s_\neg s)\Rightarrow(2s2_\neg s)$, $(2s2_\neg s) \Rightarrow(2s1_\neg s)$, $(1s3_\neg s)\Rightarrow(2s3_\neg s)v(3s3_\neg s)$ , $(2s3s_\neg s) \Rightarrow(1s3_\neg s)$ v $(3s3\ _\neg s)$, $(3s3_\neg s) \Rightarrow(1s3_\neg s)$ v $(2s3_\neg s)$ If there is a sequence of two or three identical binary process elements adjoining to the beginning point of a predicting cycle, then each predicting function that is characterized by a corresponding to the identified sequence' parameter $\alpha$ or $\beta$ belongs to the PF-set If $b(\tau,\eta)=g_1\equiv(1p1n)$. Such predicting function is called the Unit Predicting Function.

The Embodiment 2.

(This is more "risky" solution).

1. The set $C=\{c^+,c^-\}$ always belongs to the PF-set.
2. In addition, The PF-set includes each element $g_i$ of the BG*-set that can be selected on the binary process historical interval $\Delta\tau$ and:

Can be recognized as an explicit predicting function

Can be recognized as a pair or triple predicting function

If there is a sequence of two or three identical binary process elements adjoining to the beginning point of a predicting cycle, then each predicting function that is characterized by a corresponding to the identified sequence' parameter $\alpha$ or $\beta$ belong to the PF-set.

It should be pointed out that many variants might be found when synthesizing a composition of the PF-set. The present invention pretends to the fact that every PF-set realization being employed for the prediction of a non-stationary binary process must posses the described above common (3.11), (3.12) and some specific properties.

The second stage is for prediction directly. The prediction $f(t_{i-1})$ of the $k^{th}$ predicting cycle is returned by the operator F acting upon the set $PF_k$ of predicting functions such that $$\forall \tau=(t_1,t_2,\ldots,t_p), \tau=t^*\equiv t_i \Rightarrow F[x(\tau),t_i]=f(t_{i+1}) \quad (3.13)$$

$$F[x(\tau),t_i]\equiv F(PF_k,t_i)=f[x'(t_{i+1}),y(t_{i+1})]$$
$$y(t_{i+1})=1\Rightarrow f(t_{i+1})=x(t_{i-1})$$
$$y(t_{i+1})=0\Rightarrow f(t_{i+1})=\text{"nof"} \text{ - no forecast}$$

$$x'(t_{i+1})=F[x^0(t_{i+1})]=F_x[PF_k,\epsilon_k(t_i),ef(t_i),\epsilon(t_i),\phi(t_{i+1})] \quad (3.14)$$

$$y(t_{i+1})=F_y(PF_k)$$

The expression (3.13) includes a model $x'(t_{i+1})$ of a state of the binary process' forthcoming element, and it also includes a binary indicator $y(t_{i+1})$ that permits the prediction. The expression (3.14) reveals a structure of the model $x'(t_{i+1})$ . Here $\epsilon_k(t_i)$ is a predictions error vector. This vector contains information about an error status of each member of the $PF_k$-set at the point $t_i=t^*$; $ef(t_i)$ is a current efficiency of prediction; $\phi(t_{i+1})=\{\xi(t_{i+1}),\zeta(t_{i+1})\}$ is a vector of binary indicators modifying the predicting algorithm.

The model $x'(t_{p+1})$ of the binary process' forthcoming element employs the Natural Selection Algorithm in the way that each member of $PF_k$ participates in the current prediction cycle until this member produces an incorrect prediction. Each $pf_j$ $(\tau,\overline{\omega}_j,\eta_j)\in PF_k$, $(j=1,2,\ldots,J)$, $J=\#(PF_k)$, may again participate in the prediction only in the next predicting cycle. The model $x'(t_{i+1})$ is a product of a nonlinear transformation of a fundamental model $x^0(t_{i+1})$, so that $$x^0(t_{i+1})=\cup\{pf_j[\tau,\overline{\omega}_j(t_i),\eta_j].[\neg \epsilon_j(t_i)]\},\epsilon_j(t_i)\in\epsilon_k(t_i) \quad (3.15)$$

The prediction $f(t_{i+1})$ can be halted or the fundamental model's output can be inverted depending on the values of $\xi(t_{p+1})$, $\zeta(t_{p+1})$, and $ef(t_p)$ . The complete mathematical description of the second stage of predicting algorithm is presented below in the form of recurrent operator equations of Boolean variables.

| No. | Intention | Mathematical Description |
|---|---|---|
| 3.16 | Prediction $f(t_{i+1})$ of the Binary Process Element $x(t_{i+1})$ | $y(t_{i+1}) = 1 \Rightarrow f(t_{i-1}) = x'(t_{i+1})$<br>$y(t_{i+1}) = 0 \Rightarrow f(t_{i+1}) = $ "nof" |
| 3.17 | Indicator of the Prediction Permit | $\xi(t_{i+1}) = 0 \Rightarrow y(t_{i+1}) = \Pi\gamma_i(t_{i+1})$<br>$\xi(t_{i+1}) = 1 \Rightarrow y(t_{i-1}) = 0$ |
| 3.18 | Skip-operation Indicator | $[(ef(t_i) + ef_0)=0] \& [er(t_i) = 1] \& (\xi_0 = 1) \Rightarrow$<br>$\Rightarrow \xi(t_{i+1}) = 1$ else $\xi(t_{i+1}) = 0$<br>$(\xi_0 = 1) \& (\zeta_0 = 1) = $ false<br>$[\xi(t_i) = 1] \& [er(t_i)) = 1 \Rightarrow \xi_0 = 0$ |
| 3.19 | Current Efficacy of Prediction | $ef(t_i) = \Sigma R(t_i) - \Sigma W(t_i)$<br>$R(t_i) = \neg er(t_i) \& y(t_i)$<br>$W(t_i) = er(t_i) \& y(t_i)$ |
| 3.20 | Prediction Method's Error | $f(t_i) = x(t_i) \Rightarrow er(t_i) = 0$<br>$f(t_i) \neq x(t_i) \Rightarrow er(t_i) = 1$ |
| 3.21 | Model $x'(t_1)$ of the Binary Process Element $x(t_1)$ | $\zeta(t_{i+1}) = 0 \Rightarrow x'(t_{i+1}) = x^0(t_{i+1})$<br>$\zeta(t_{i+1}) = 1 \Rightarrow x'(t_{i+1}) = \neg x^0(t_{i+1})$ |
| 3.22 | Inversion-operation indicator | $[ef(t_i) + ef_0 \leq 0] \& [\neg er(t_i) = 1] \& \zeta_0 = 1) \Rightarrow$<br>$\Rightarrow \zeta(t_{i+1}) = 1$ else $\zeta(t_{i+1}) = 0$<br>$(\zeta_0 = 1) \& (\zeta_0 = 1) = $ false<br>$[\zeta(t_i) = 1] \& [er(t_i)) =1 \Rightarrow \zeta_0 = 0$ |
| 3.23 | Base Model $x^0(t_i)$ of the Binary Process Element $x(t_i)$ | $x^0(t_{i+1}) = \cup \gamma_j(t_{i+1})$,<br>$J = \#(PF_k)$, |
| 3.24 | Active at $\tau = t_{i+1}$ Predicting Function $\gamma_j(t_{i+1})$ | $\epsilon_j(t_i, r_{i+1}) = 0 \Rightarrow \gamma_j(t_{i+1}) = pf_j[t_{i+1}, \eta_j]$<br>$\epsilon_j(t_i, r_{i+1}) = 1 \Rightarrow \gamma_j(t_{i+1}) = 0$ |
| 3.25 | Indicator of the j-th Predicting Function's Error at $\tau = t_i$ | $\epsilon_j(t_i, r_{i+1}) = [\delta_j(t_i) \vee \epsilon_j(t_{i-1}, r_i)] \cdot (\neg r_{i+1})$<br>$pf_j[t_i, \eta_j] = x(t_i) \Rightarrow \delta_j(t_i) = 0$<br>$pf_j[t_i, \eta_j] \neq x(t_i) \Rightarrow \delta_j(t_i) = 1$ |
| 3.26 | Indicator of the current predicting cycle's end (RESET) | $J_{i+1} \neq 0 \Rightarrow r_{i+1} = 0; J_{i+1} = 0 \Rightarrow r_{i+1} = 1$<br>$PF_k(t_i) \subseteq PF_k(t_{ck})$<br>$J_i = \#(PF_k(t_i)) \leq \#(PF_k(t_{ck}))$ |
| 3.27 | Cardinal Number of the $PF_k(t_{i+1})$ - set | $A = J - \Sigma[\neg \epsilon_j(t_i)]$<br>$A > 0 \Rightarrow J_{i+1} = A; A = 0 \Rightarrow J_{i+1} = J$ |
| 3.28 | $(j = 1, 2, \ldots, J)$ | Predicting Function's Ordering Number |
| 3.29 | $(k = 1, 2, 3, \ldots)$ | Predicting Cycle Ordering Number |
| 3.30 | $(\tau = t_1, t_2, \ldots, t_p)$,<br>$(i = 1, 2, \ldots, p)$ | Binary Process Discrete Argument<br>i - Ordering Number in a Binary Sequence |

The most important case where the present invention might be embedded, is a non-stationary (chaotic) binary process sequential prediction. Therefore, such case needs a more detailed description.

Let there be a binary sequence $S_2$

```
           10 12   14   16 18   20   22   24 26
S₂: - + - - - - + - + - + - + + + - + + + + + - + + - .
    1 2 3 4 5 6 7 8 9  11   13   15   17   19   21   23   25
```

In this case, it is assumed that at the initial point $\tau=t_{ck}$ of the $k^{th}$ predicting cycle, the set of predicting functions $PF_k=BG^*$, $\#(PF_k)=15$. It is also given that the moment $t_{ck}$ corresponds to the seventh element of the sequence $S_2$. To make the predicting procedure observable, each member of the $PF_k$-set is placed in its own line right under the sequence $S_2$. This illustration is depicted on the FIG.3. The following conventions are present in the above illustration. Prediction by the PF-set=BG-set, $\#(BG)=15$; R - Correct Prediction, W - Incorrect Prediction. Each $PF_k$-set member is also shown beginning with the sequence's eighth element. This drawing makes a clear vision of the mechanism of prediction. Any prediction is not allowed until a conjunction of the predicting functions has released the prediction. Then, the Natural Selection Algorithm is applied to the $PF_k$-set. The function $pf_1[\tau,\eta_1] \equiv (1p1n)$, which is the winner in the first cycle of prediction, becomes the outsider in the next cycle. The leader in the second cycle is $pf_{15}[\tau,\eta_{15}] \equiv (5p1n)$. Each member of the $PF_k$-set has its own initial phase $\overline{\omega}(t_c)$ that is calculated at the beginning moment of the predicting cycle. It is possible to see that the behavioral genotype ($BG^*$) itself can not be used as the set of predicting functions in many cases with non-stationary binary processes. For example, the binary sequence $S_2$ consists of the following 6 completed elementary behavioral functions: $b_1=(1p4n)$, $b_2=b_3=b_4=(1p1n)$, $b_5=(4p1n)$, and $b_6=(5p1n)$. The replacement of the identical functions $b_3$, $b_4$ as well as the replacement of the function $b_6$ which is almost identical to the $b_5$, makes the selected for this example $BG^*$-set inapplicable for a prediction. The PF-set with an abundant number of members causes a frequent blocking of the prediction with an absence of correct predictions in the predicting cycle. On the other hand, neglecting most of the elements in the composition of the behavioral genotype leads to an increase in the number of prediction errors with simultaneous contraction of the predicting cycle. The first stage of the predicting algorithm designed for the determination of the PF-set's composition at the initial point of the predicting cycle is of great importance. The convincing example of applying the Embodiment 1 and the Embodiment 2 to the prediction of the sequence of a binary game random outcome is depicted on the FIG. 4. The following conventions are present in the above illustration: inv.–inversion predicting mode, dir.– direct predicting mode.

Updating of the behavioral genotype membership and re-estimating of the binary process instability level. The end-point of a $k^{th}$ current predicting cycle and the beginning-point of the next predicting cycle is the same point. At this moment two actions might be taken. The first action is a re-estimating of the binary process instability level. The second action is a recalculating of the BG-set membership. Both of these actions are subordinate to some schedule. The schedule is a part of the method's implementation algorithm. One of the possible embodiments that the authors of the present invention used for a prediction of the explicitly non-stationary binary processes, updates of the BG-set after several adjacent behavioral functions appeared in the decomposition (3.1). The same algorithm re-estimates of the binary process instability level accordingly with a schedule that is functionally dependent on the beginning of a predicting cycle. The particular schedule selection depends on the object of prediction and might be either determined during the method's implementing system design or to be a product of an adaptive scheduling subsystem incorporated in such implementing system.

The described above method of prediction increases the efficacy of the binary process prediction. This method expands the applicability of cognitive predicting systems on the field of non-stationary processes. The main advantage of the method is a more intensive use of the "present" and the "nearest past" area in the binary process domain. Contrary to the prior art's solutions, the present invention does not demand in the zone $[t_p, t_{p+w}]$, ($w>>1$) of the guaranteed binary process stability. The iterative optimizing "Errors and Trials" genetic algorithm is also absent in the predicting procedure of the present invention. This fact makes possible the application of the present invention to a population of real - time systems.

The present invention can be embedded in any system that permits a mapping of at least one of the system's output on the space of binary processes. Each step of the predicting algorithm is associated with a certain block or with a combination of blocks in the predicting system's block diagram. The predicting system that represents the method's embodiment is described in detail below. The predicting system has a two level hierarchy. The first level is a subsystem ($SS_1$) for the behavioral genotype identification. The second level is a subsystem ($SS_2$) for the sequential prediction of a binary element's state in the binary process. The global input of the predicting system is an output of the object of prediction. The real object of prediction may have a continuous output. Let this output be denoted as $u(t) \in U$. In that case, the binary process $x(\tau) \in X$ is a result of a mapping of the set U of continuous functions into the set X of discrete binary functions. The system includes a Binary Process Mapping Block (BM) that transforms the output $u(t)$ of the object of prediction into the binary sequence $x(\tau)$, $\tau=t_1, t_2, \ldots$. The BM-block quantifies, if it is necessary, the signal $u(t)$. The quantification may be performed by time and/or by level of the input signal, also known as a time sampling procedure and/or an amplitude qualification. In total, the output of the BM-block is a binary vector-function $x(\tau)$ of the discrete argument $\tau=(t1, t_2, \ldots, t_p)$, where $t_p$ is the latest observed value of $\tau$.

Consider some typical examples. Assume that an analog positive signal $u(t)$ is an output of the object of prediction. Obtaining of a single binary process $x(\tau)$ from the signal $u(t)$ includes the following steps.

Quantification by-time of the signal $u(t)$.

$$\forall u(t) > 0, u(t) \in U \Rightarrow u(\tau) = u(t_1), u(t_2), \ldots, u(t_p) \qquad (3.31)$$

$$t_{i+j} = t_i + \lambda, i=1,2,\ldots,p$$

Set up a value $u^o \geq 0$, $u^o \in U$ so that $$\forall u^o, [u(t_i) - u^o] > 0 \Rightarrow x(t_i) = \text{"1"} v\text{"+"} \qquad (3.32)$$
$$\forall u^o, [u(t_i) - u^o] \leq 0 \Rightarrow x(t_i) = \text{"0"} v\text{"-"}$$

Figure 5:
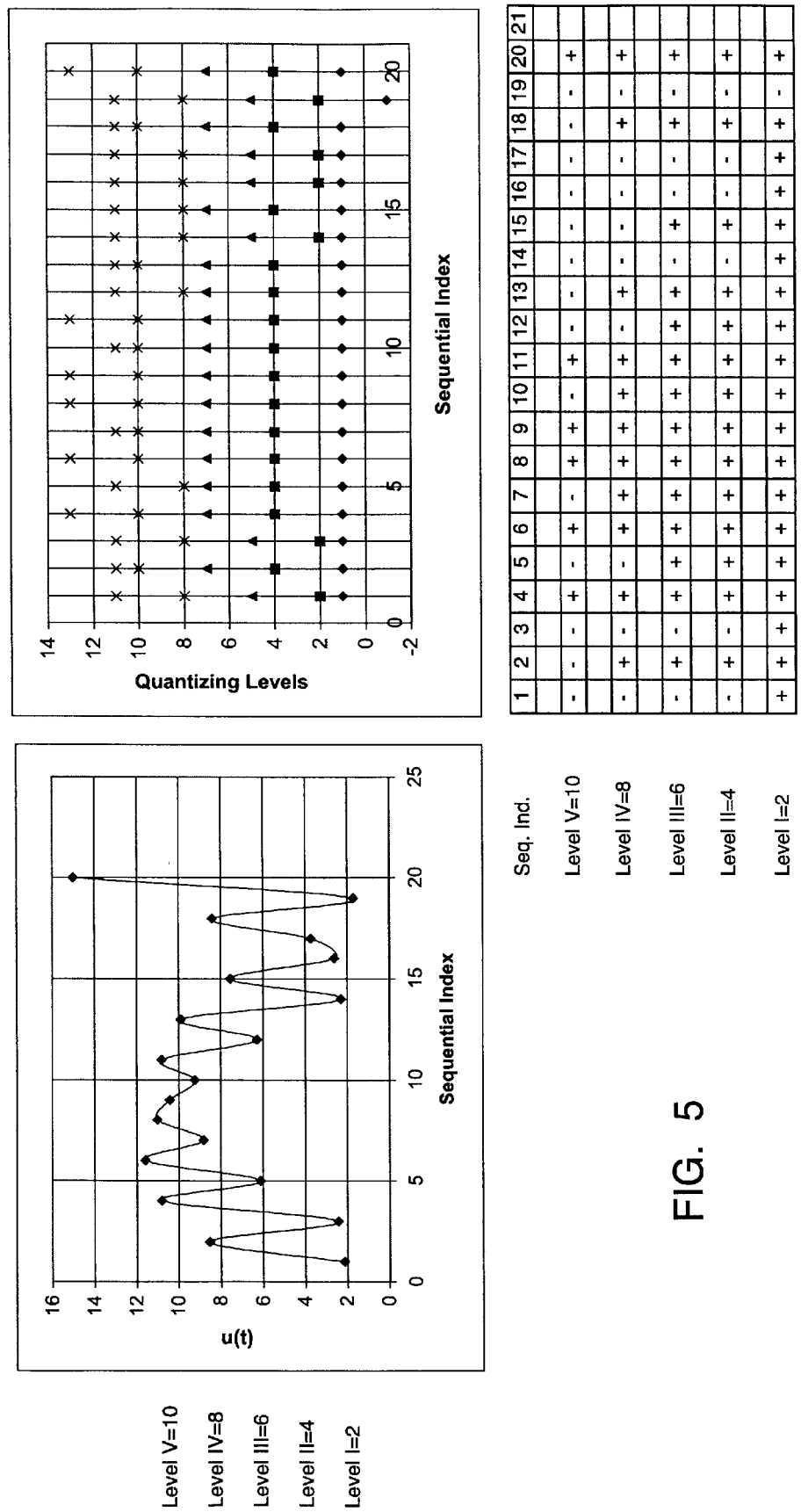
FIG. 5 is an illustration on a binary process mapping on the space of binary processes.
Figure 6:
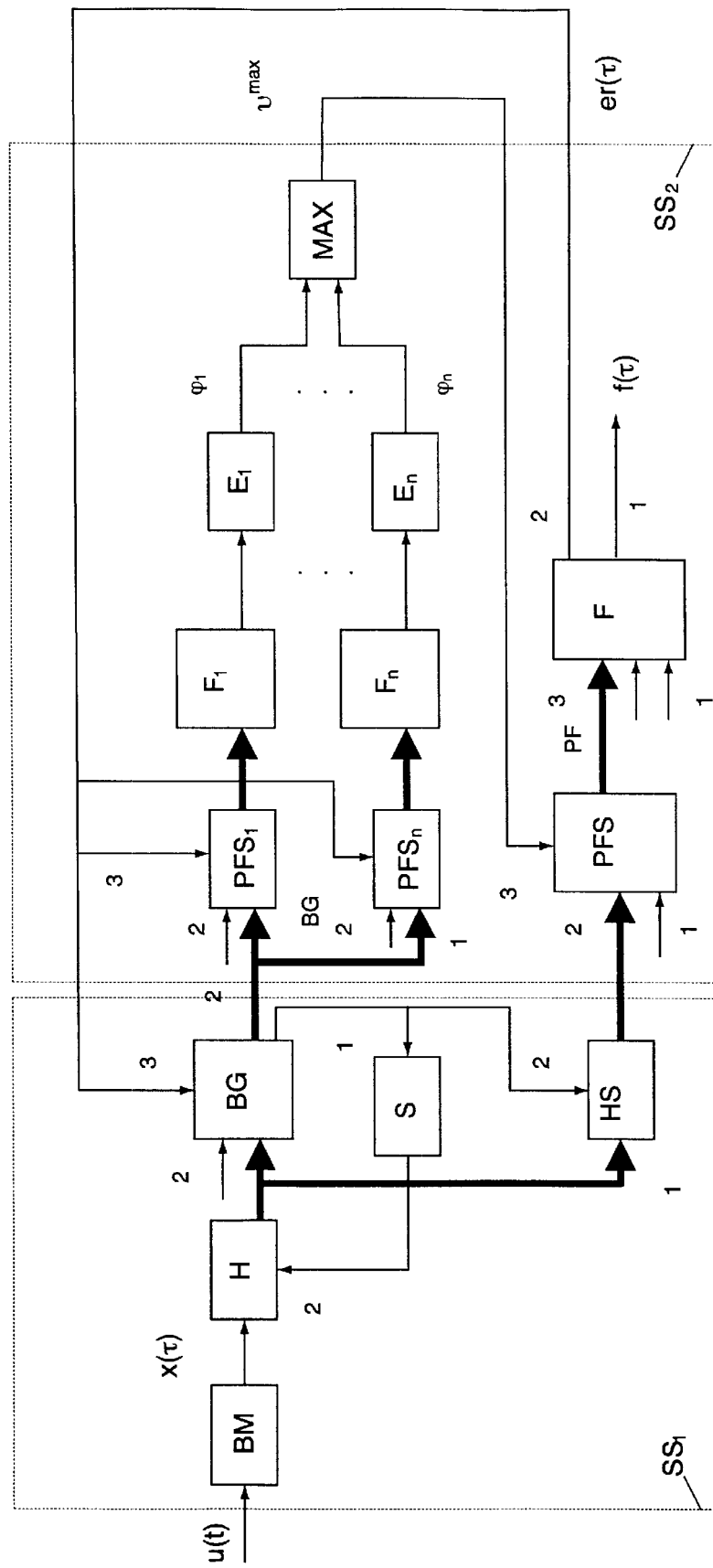
FIG. 6 depicts the block diagram of the predicting system for a sequential prediction of a binary element's state in a binary process.

The value $u^o$ is a single quantizing level. An assignment of a vector $u^o = (u^o_1, u^o_2, \ldots, u^o_m)$, $u^o \subset U$ of such levels makes possible to get several binary processes $x(\tau)$ for the same input signal $u(t)$. Here, each component of the vector $x(\tau)$ is a product of this two-step (3.31, 3.32) procedure. Let us denote this procedure by $B \equiv B(\lambda, u^o): u(t) \to x(\tau)$. Here, the parameter $\lambda$ defines the sampler period of the by-time, or sampling rate of the, quantification. The examples of such mappings are shown in the FIG. 5. Every component of $x(\tau)$ is processed by a separate identical tract in the $SS_1$, and then the data from that tract come to a corresponding tract in the $SS_2$. With a view of a simplification, all descriptions will be further provided for a single component of the vector $x(\tau)$. A block diagram of the one-dimensional predicting system is shown in FIG. 6.

Subsystem $SS_1$. The main objective of the subsystem $SS_1$ is a determination of a composition of the behavioral genotype set. The $SS_1$-subsystem provides such determination on a periodical basis. The subsystem $SS_1$ is comprised of a Binary Process Mapping Block (BM), a Binary Process History Storage Block (H), a Behavioral Genotype Creator (BG), a Sampling Block (S), and a Binary Process Shortest History Storage Block (HS).

The H-block memorizes the state of each sequential element of the process $x(\tau)$ that comes from the BM-block, and forms a binary string $h[x(\_),t_q,t_p] \equiv h[x(\_)]$. The storage space of the H-block depends on the object of prediction's peculiarities and must be determined during the system design. The string $h[x(\_)]$ goes to an input of the BG-block and to an input of the HS-block. The latter creates a binary string $hs[x(\_),t_s,t_p] \equiv hs[x(\_)], s \leq q$. The Bblock makes a decomposition (3.1) of the string $h[x(\_)]$ on the interval $[t_{(r-\lambda_j)}, t_r], t_r \leq t_p$. The ordering number j of the sample's length $\lambda_j$ is linked to the value $t_r$ when the decomposition has been initiated. The Sampler in the $SS_1$-subsystem's local feedback controls the value of the $\lambda_j$ according to a criterion of statistical stability, or robustness, (e.g., the stability of the arithmetic average, or of the sample mean, or both the arithmetic average and the standard deviation) of the biggest elementary behavioral function's period $\eta^{max}(t_r,\lambda_j) \equiv \eta_j^{max}$ taken from the sample. The $\eta_j^{max}$ variable is a substantial parameter of the predicting system. It follows from the expression (3.4), that $\eta_j^{max}$ defines a cardinal number of the $BG_j$-set. Any methods of a statistical analysis are allowed at this stage. A human operator also may set up the value $\lambda_j$. The BG-block generates members of the $BG_j^*$-set by the formulas (3.4), (3.5). The j-index in the behavioral genotype notation points to the fact that this set is going to be updated according to some schedule. The $BG_j^*$-set's composition data is a main output of the subsystem $SS_1$. Information about the $BG_j^*$-set's membership come to an input of each Selector of Predicting Functions of the subsystem $SS_2$. The binary string $hs[x(\_),t_s,t_p]$ goes from an output of the HS-block to another input of the PFS-block of the $SS_2$. The BG-block receives a feedback signal from the $SS_2$. This signal controls the updating schedule for the BG*-set.

Subsystem $SS_2$. The main objective of the subsystem $SS_2$ is selecting the set of predicting functions from the BG*-set and then, performing a prediction. The subsystem $SS_2$ has some distinctive singularities.

First, the subsystem involves a cyclic, non-iterative, and non-optimizing method of prediction.

Second, the subsystem employs the binary process instability evaluation for a selection of an appropriate set of predicting functions at the initial moment of a predicting cycle. The evaluation may, but not necessarily involve traditional genetic algorithm schemes.

Third, the subsystem insures that the cardinality of the set of predicting functions is inversely related to the evaluated binary process instability level, or transients effect on predictability, so that, for the explicitly non-stationary processes $PF_k \subseteq BG_j^*$.

The $SS_2$ subsystem is build from the Selectors of Predicting functions ($PFS_i$), Predicting Blocks ($P_i$), and Binary Process Instability Estimators ($E_i$), i=1,2, . . . , m. The subsystem $SS_2$ is comprised of two contours. The first contour is the main contour of the $SS_2$. This contour includes a tract PFS→P that is responsible for the selection of the set $PF_k \equiv PF$ $(t_{c,k})=PF(BG_j^*)$ of predicting functions. These functions are only active in the current $k^{th}$ predicting cycle. The $PF_k$-set is an output of the PFS-block. The actual prediction $f(\tau)$ is the first output of the P-block of the main contour. The second contour evaluates the binary process instability level. The second contour is comprised of several parallel channels. These channels have an identical structure such as $PFS_i \rightarrow P_i \rightarrow E_i$. Each channel generates a respective component of the estimating vector-function $\phi(\tau,t_e)$, which is defined by the expressions (3.6)–(3.8). The evaluation is performed by application of the retrospective predicting procedure to some interval $[t_q,t_r], t_r \leq t_p$ of the binary process history. Here, $t_e$ is an evaluation schedule point.

The second output of the P-block of the main contour is the indicator $er(\tau)$ defined by the expression (3.20). This indicator signals to the exterior of the $SS_2$-subsystem about the end of the current cycle of actual prediction.

The BG-block of the $SS_1$-subsystem takes into account the state of such "End-of-Cycle" indicator and uses this information for scheduling of the next update of the BG*-set. The $er(\tau)$signal is also used by the $SS_2$ to perform the next instability evaluation of the binary process. A link between the P-block of the $SS_2$-subsystem and the BG-block of the $SS_1$-subsystem closes the global feedback in the predicting system. Depending on the system's embodiment, a human operator of the predicting system may update the schedules, as well as the setup parameters for the binary process decomposition and subsequent statistical analysis of the elementary behavioral functions. The possibility of the human operator's involvement is reflected in the block diagram of the predicting system as the second input of the BG-block in the $SS_1$-subsystem and as the first input of the PFS-block in the $SS_2$-subsystem.

Predictions performed during a predicting cycle are independent of the evaluation procedure. Each of the three main procedures in the system (the determination of the behavioral genotype, the evaluation of the binary process instability, and the selection of the set of predicting functions, which are active in the current predicting cycle) can be performed independently and do not affect the system's speed.

The method allows performing real time predictions of binary processes, including non-stationary processes, regardless of possible speed and memory limitations of computing resources.

The predicting system that implements the method increases efficiency of any entity that includes this system as a subsystem.

To further demonstrate the efficiency of the predicting system, we embedded the subject system in several systems. Each of these systems represents their classific type. The utilization of the present invention as a subsystem of any of the "client systems" returns a substantial immediate effect.

Application 1.

The Measuring System with Prediction of the Signal-to-Noise Ratio.

Figure 7:
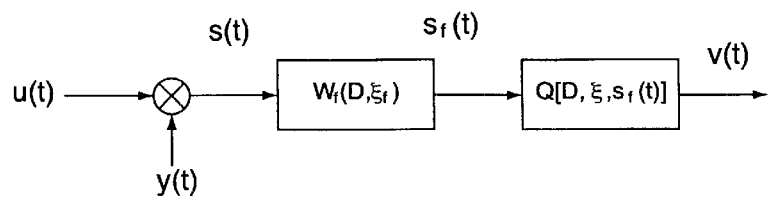
FIG. 7 depicts the original measuring system block diagram.

Let there be a measuring system that measures a value $\phi(t)$. The system's block diagram is shown in the FIG. 7. The following conventions are present in the above illustration:

| | |
|---|---|
| $W_f(D, \xi_f)$ | Filter's Operator |
| $Q[D, \xi, s_f(t)]$ | The Operator of the Remaining Part of the Measuring System |
| u(t) | useful input signal |
| y(t) | additive noise |
| v(t) | output signal |

There is a signal s(t)=u(t)+y(t) at the system's global input. Here, u(t) is an unknown useful signal that reflects the value $\phi(t)$. The signal y(t) is an additive noise. The signal v(t) is the measuring system's global output. For example, let us assume that the system is comprised of an analog filter represented by a polynomial $W_f(D,\xi_f)$ of a linear differential operator D≡d/dt. The vector of the filter's parameters consists of a gain factor $K_f$ and a vector $T_f$ of time-dimensional constants characterizing the filter's dynamics, so that $\xi_f=(K_f, T_f)$. The remaining part of the system might be described in general by a nonlinear operator $Q[D,\xi,s_f(t)]$, D≡d/dt. The signal $s_f(t)$ is the filter's output $s_f(t) = W_f(D,\epsilon_f)s(t)$. A multiplicative disturbance also might exist in the system. In that case, the vectors $\xi_f$ and $\xi$ of the system's elements should be a time domain functions, so that $\xi_f=\xi_f(t)$, $\xi=\xi(t)$.

A common way of how measuring systems evaluate an extraneous disturbance is to calculate a signal-to-noise ratio defined as $\rho(t)$=(output due to signal)/(output due to noise) [B. G. Kuo, 1991]. The low $\rho(t)$ indicates that the system is unable to produce an accurate measurement. A traditional approach for the noise rejection is filtration. However, no filter of any kind can produce a total noise rejection. Thus, the accuracy and the precision of the measurement are bounded by the system's filtering ability. The present invention provides a new powerful solution for a problem of additive noise rejection and for a problem of multiplicative disturbances compensation in measuring systems. The new approach works well in those cases where the traditional methods fail. The solution is based on a measuring algorithm that returns each resulting measurement $v_j \equiv v(t_j,\lambda_j)$ by an aggregation of a string of sub-measurements. The $t_j$ is the $j^{th}$ moment of the discrete time when the resulting measurement is done; the $\lambda_j$ indicates the length of such measurement. The sub-measurement $\mu_{j,i} \equiv \mu(t_{j,i},\mu_{j,i})$ of the measurement $v(t_j,\lambda_j)$ is a specifically selected output of a measuring block-procedure. The measuring block-procedure $\theta_{j,i} \equiv \theta(t_j,i,\lambda_{j,i})$ is a completed measurement associated with an index number (i) of each repetition of the measuring algorithm.

In general, the measuring algorithm concludes transformation of the continuous signal-to-noise ratio value $\rho(t)$ into a binary process $x(\tau)$ according to the formulas (3.31, 3.32) so that $x(\tau)=B(\rho(t))$. Each element $x(t_i) \in x(\tau)$ is an evaluation of the signal-to-noise ratio level taken at a moment $t_i$ of the discrete time $\tau=t_1,t_2,\ldots$. The evaluation formula is similar to the formula (3.32) where u(t) and u°(t) are substituted respectively with $\rho(t)$ and $\rho°$. Then, to get the noise rejected, the $j^{th}$ outcome measurement $v(t_j,\lambda_j)$ needs to be organized as an aggregate function A of a sequence of those sub-measurements, i.e., $$v(t_j,\lambda_j)=A[\mu_{(j,1)},\mu_{(j,2)},\ldots,\mu_{(j,m)}] \quad (3.33)$$

$$\forall i=1,2,\ldots,m \Rightarrow \mu(t_{j,i},\lambda_{j,i})=\chi(t_{j,i}) \cdot \theta(t_{j,i},\lambda_{j,i}) \quad (3.34)$$

$$\Sigma \lambda_{j,i} \leq \lambda_j \quad (3.35)$$

Here, the measuring block-procedure $\theta_{j,i}$ is executed regularly at each moment $t_{j,i}$ and does not depend on the process $x(\tau)$. The parameter $\lambda_{j,i}$ is a length of the procedure $\theta(t_{j,i},\lambda_{j,i})$. The function $\chi(t_{j,i})$ is a numerical conversion of the prediction $f(\tau)$ of the binary process $x(\tau)$ at the moment $\tau=t_{j,i}$. Thus, the sub-measurement $v_{j,i}$ may accept a value of the measuring block-procedure $\mu_{j,i}$ only if such action is permitted by the control function $\chi_{j,i} \equiv \chi(t_{j,i})$. The measuring block-procedure may have a rather complex algorithm. However, it follows the expression (3.35), that an interval between two adjacent measurements $(v_j, v_{j+1})$ is defined by a sum of the length of each measuring block-procedure that is involved in the current measurement. The number m of such procedures can be predetermined or can be calculated by the system itself based on a criterion of a desired accuracy, and so forth. The same approach is used for the multiplicative disturbance rejection. Once the prediction of the signal-to-noise ratio has indicated "low", the measuring system automatically switches to a multiplicative disturbance compensation mode. Information about the measured value $\phi(t)$ is locked in this mode. A testing noiseless signal goes to the system's input instead of the signal s(t). This signal is used for the adjustment of the system's drifting parameters. Thus, the measuring system with the signal-to-noise ratio prediction mostly accumulates data with a low noise component.

Figure 8:
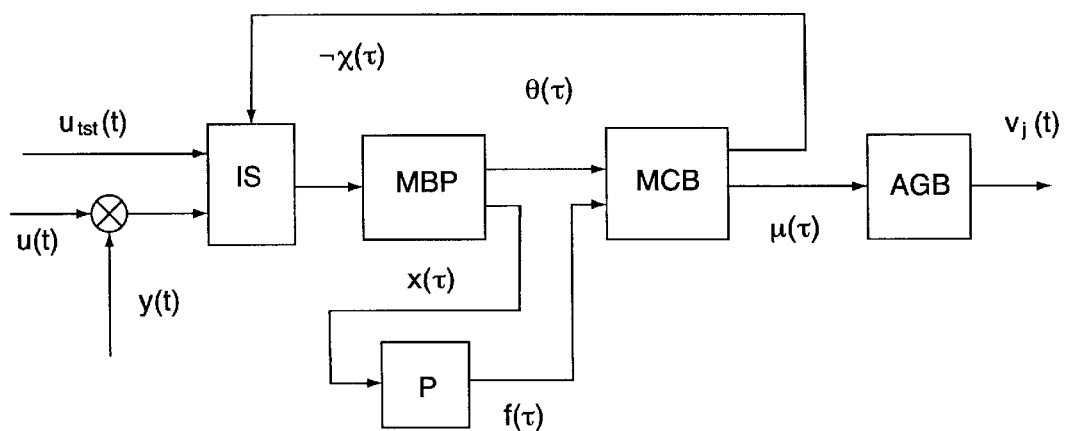
FIG. 8 depicts the block diagram of the measuring system with the signal-to-noise ratio prediction.

Here is a justification of such measuring system. The block diagram of this system is depicted in FIG. 8. The following conventions are present in the above illustration:

| | |
|---|---|
| IS | Input Switch |
| MBP | Measuring Block-Procedure Subsystem |
| MCB | Measuring Process Control Block |
| P | Signal-to-Noise Ratio Predictor |
| AGB | Aggregation Block |
| u(t) | useful input signal |
| $u_{tst}(t)$ | noiseless testing signal |
| y(t) | additive noise |
| $v_j(t)$ | j-th measurement |
| $x(\tau)$ | signal-to-noise ratio binary evaluation process |
| $f(\tau)$ | prediction of an element of the signsl-to-noise ratio binary evaluation process |
| $\theta(\tau)$ | Measuring Block-Procedure output |
| $\mu(\tau)$ | Sub-measurement's output |
| $\chi(\tau)$ | Working mode control signal |

The system is comprised of a Measuring Block-Procedure Subsystem (MBP), an Aggregation Block (AGB), a Signal-to-Noise Ratio Predictor (P), and a Measuring Process Control Block (MCB). The input of the MBP-subsystem is either the informative signal s(t) (if the system works in the measuring mode), or the testing noiseless signal $u_{tst}(t)$ (if the system works in the adjustment mode). The subsystem MBP produces a measurement $\theta(\tau)$, $\tau=t_1,t_2,\ldots,t_m$ which is an output of the measuring block-procedure. Another output of the MBP-subsystem is the binary process $x(\tau)$ or the binary vector-process $x(\tau)$, which is the binary evaluation of the signal-to-noise ratio. The signal $x(\tau)$ goes to an input of the predictor. The predictor P generates a prediction $f(\tau)$ of the element $x(\tau)$ corresponding to a forthcoming result $\theta(\tau)$ of the measuring block-procedure. The MCB-block produces the output signal $\chi(\tau)$ that simultaneously controls the sub-measurement's value $\mu(\tau)$. If the forecasted level of the $\rho(\tau)$ is high, the sub-measurement $\mu(\tau)$ has some value and is accounted in the $j^{th}$ measurement $v_j$. If the forecasted level of the $\rho(\tau)$ is low, the sub-measurement $\mu(\tau)$ is not accounted in the $j^{th}$ measurement $v_j$.

The static accuracy (A) of the measuring system may be evaluated as follows $$\exists \phi^* \equiv \text{constant}, \forall \phi(t) = \phi^* \Rightarrow A = d^2/v_{av}^2 \quad (3.36)$$

Here, d denotes the standard deviation from a sample of the measuring system's discrete output $v(\tau)$; $v_{av}$ denotes this output's arithmetic average, also known as sample's mean. With an assumption that the aggregation function A in the formula (3.33) is the relational algebra AVERAGE-Function, the formula (3.36) can be rewritten in a way that $$A=[n^{-1}\Sigma(v_j-v_{av})^2]/v_{av}^2\equiv \quad (3.37)$$

$$\equiv n^{-1}\Sigma\{[m_j^{-1}\Sigma\chi(t_{j,i}).\theta(t_{j,i},\lambda_{j,i})]-v_{av}\}^2/v_{av}^2$$

It follows the system block diagram that the signal $\rho(t)$ can be determined by a formula $$\rho(t)\cong s_f(t)/(s(t)-s_f(t)) \quad (3.38)$$

$$s(t)=u(t)+y(t)$$

$$s_f(t)=W_f(D,\xi_f)s(t) \quad (3.39)$$

$$u(t)\in U, \phi(t)\in\Psi, U\sim\Psi \quad (3.40)$$

$$D\overset{\vartheta}{=}d/dt$$

Both signal s(t) and $s_f(t)$ in the (3.38) are accessible. The signal $\rho(t)$ can also be obtained by measuring the noise component involving a separate channel of the MBP. In that case, the noiseless testing signal is employed; and a correlation between the actual noise y(t) and the noise measured at the separate channel must be proved.

In order that to calculate the system's static accuracy, the value of the measured variable $\phi(t)$ should be constant, so that $\phi(t)=\phi^*\equiv$constant$\Rightarrow u(t)=u^*\equiv$constant. Therefore, the formula (3.39) is transformed to $$S_f(t)=W_f(D,\xi_f)[u^*(t)+y(t)]=W_f(0,\xi_f)u^*+W_f(D,\xi_f)y(t) \quad (3.41)$$

Therefore, the $I^{th}$ sub-measurement of the $j^{th}$ measurement can be described as follows $$\mu_{j,i}=\chi(t_{j,i}).\theta(t_{j,i},\lambda_{j,i}) \quad (3.42)$$

$$\theta_{j,i}\equiv\theta(t_{j,i},\lambda_{j,i})=\delta(t-i.\lambda_{j,i}).\theta(t)$$

$$\theta(t)=Q[D,\xi,W_f(0,\xi_f)u^*+W_f(D,\xi_f)y(t)]\cong \quad (3.43)$$

$$\cong v_{av}+Q[D,\xi,W_f(D,\xi_f)y(t)]\equiv v_{av}+Q[y(t)]$$

$$\exists\lambda\in R,\ t-i.\lambda=0 \Leftrightarrow \delta(t-i\lambda)=1, i=1,2,\ldots$$

$$D\overset{\vartheta}{=}d/dt$$

We have to admit that the Congruent Sign "≅" in the expression (4.43) appears only in cases of a strong non-linearity of the operator $Q[D,\xi,s_f(t)]$ which represents the post-filter part of the MBP-block of the measuring system.

It is observed in every effective measuring system that $W_f(0,\xi_f)u^*\to K_fu^*$ and $W_f(D,\xi_f)y(t)<<K_fu^*$. Hence, it follows from the expressions (3.38), (3.41) that $$\rho(t)\cong\rho'(t)=u^*/y(t) \quad (3.44)$$

The goal of our analysis is to get a robust evaluation of the measuring system accuracy; therefore, any Congruent Sign will be further substituted with the Equal Sign.

Substitution of the expression (3.43) by the expression (3.44) allows, in combination with the expression (3.37)–(3.42), seeing how the Signal-To-Noise Ratio influences the system's measuring accuracy $$\theta(t)=v_{av}+Q[u^*/\rho'(t)]\forall|\rho'(t)|>0$$

$$A=n^{-1}\Sigma m_j^{-2}\{\Sigma\chi_{j,i}\omega_{j,i}[u^*,\rho'(t)]-m_j\}^2 \quad (3.45)$$

$$\omega_{j,i}\equiv\omega_{j,i}[u^*,\rho'(t)]=1+\delta(t-i.\lambda_{j,i})Q[u^*/\rho'(t)]$$

$$Q[u^*/\rho'(t)]=v_{av}^{-1}Q[u^*/\rho'(t)]\forall|v_{av}|>0$$

It follows from (3.31), (3.32) representing the binary process x(τ) that each time when the prediction of the indicator ρ (τ) is correct, the absolute value of the variable $\omega_{j,i}$ is less than $\omega^o>0$; and when the prediction of the indicator ρ (τ) is incorrect, the absolute value of the variable $\omega_{j,i}$ is greater or equal to $\omega^o>0$. Let us mark the former case with ($\omega^o-g$), g>0. Respectively, the mark for the later case is ($\omega^o+g$). Now we can see how the efficiency of the Signal-To-Noise Ratio prediction relates with the accuracy of the measuring system $$A=n^{-1}\Sigma[(1/1+\Phi_j)(\omega^o+g)+(\Phi_j/1+\Phi_j)(\omega^o-g)+1]^2 \quad (3.46)$$

$$\Phi_j\equiv\Phi(er(\tau),m_j)=\xi\neg er(\tau)/\xi\epsilon(\tau)\forall\Sigma er(\tau)\neq 0$$

$$\Phi(er(\tau),m_j)=\phi^o\forall\Sigma er(\tau)=0$$

$$\tau=(t_{j,3},t_{j,2},\ldots,t_{j,k}), k\equiv m_j; j=1,2,\ldots,n$$

Here, er(τ) is the prediction method's error described in the expression (3.20). The discrete time τ characterizes sub-measurements of the $j^{th}$ measurement.

The expression (3.46) shows that by having the effective predictor in the measuring system, the possible low noise component in the current measurement, is Φ times greater than the possible high noise component, Φ>1.

Figure 9:
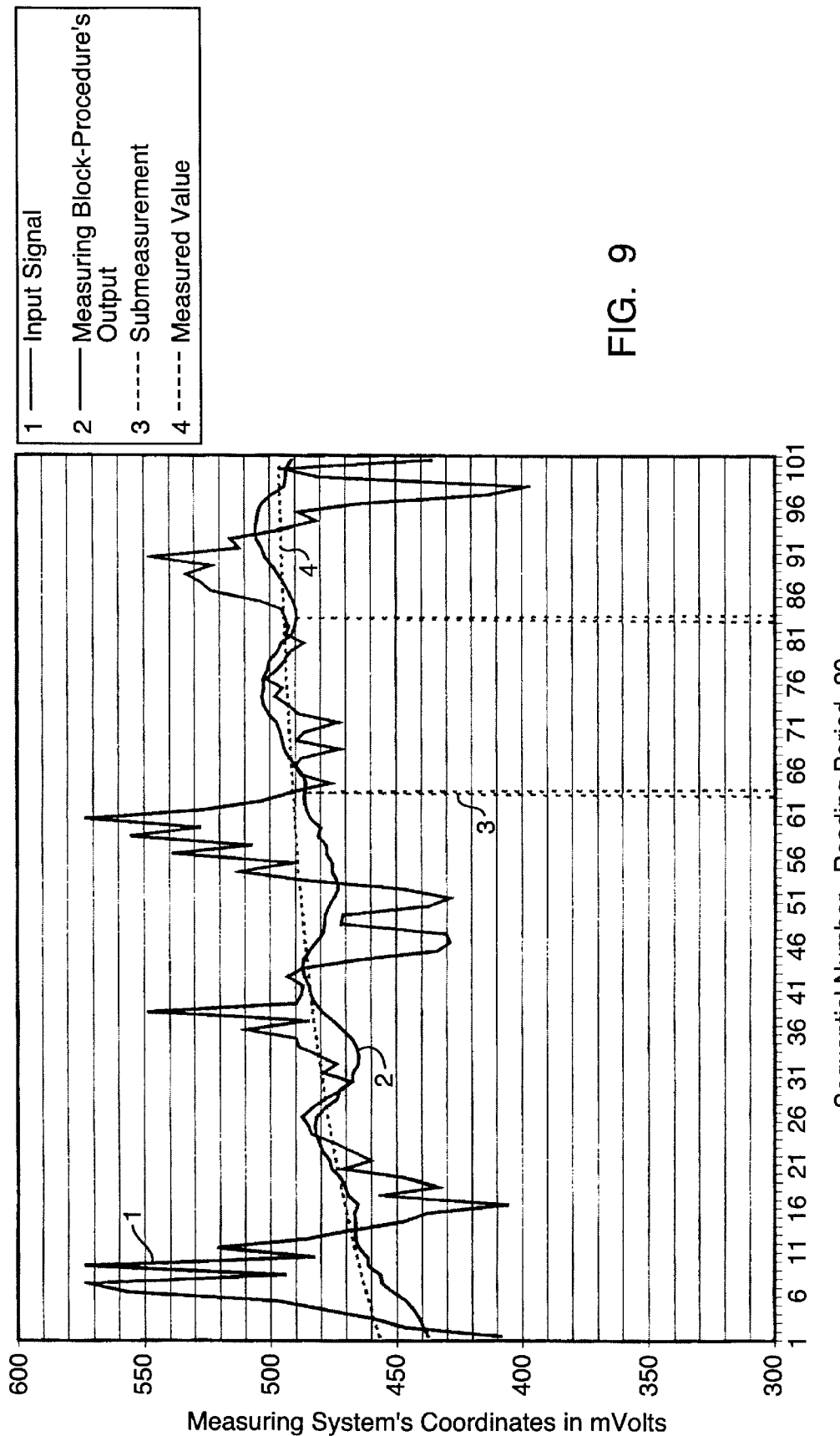
FIG. 9 illustrates the measurement with the signal-to-noise ratio prediction.

The explained above approach was proven experimentally. The digital output of an ultrasonic distance meter was put into a computer simulator of the predictor. The illustration of the results of this trial is shown in FIG 9. The presented graphical material is self-explanatory and does not require comments.

Application 2.

The System with a Compensation of Nonlinear Effects by Means of Prediction.

There are many measuring, control, data transferring, audio/video, end etc., systems, which suffer from harmful nonlinear effects. For example, a measuring system with an input filter that loses its ability to transfer signals each time when an input signal exceeds some threshold. This is called a Filter's Saturation. The input cascade of such system is comprised of a preamplifier and a filter. The mathematical model of these devices may contain the following expressions $$\forall s_{max}>0, |s(t)|<s_{max}\Rightarrow s_f(t)=K_aW_f(D,\xi_f)s(t) \quad (3.47)$$

$$\forall s_{max}>0, |s(t)|<s_{max}\Rightarrow s_f(t)=K_aW_f(D,\xi_f)s(t) \quad (3.47)$$

$$\forall s_{max}>0, |s(t)|\geq s_{max}\Rightarrow s_f(t)=V$$

$$s(t)=u(t)+y(t)$$

Figure 10:
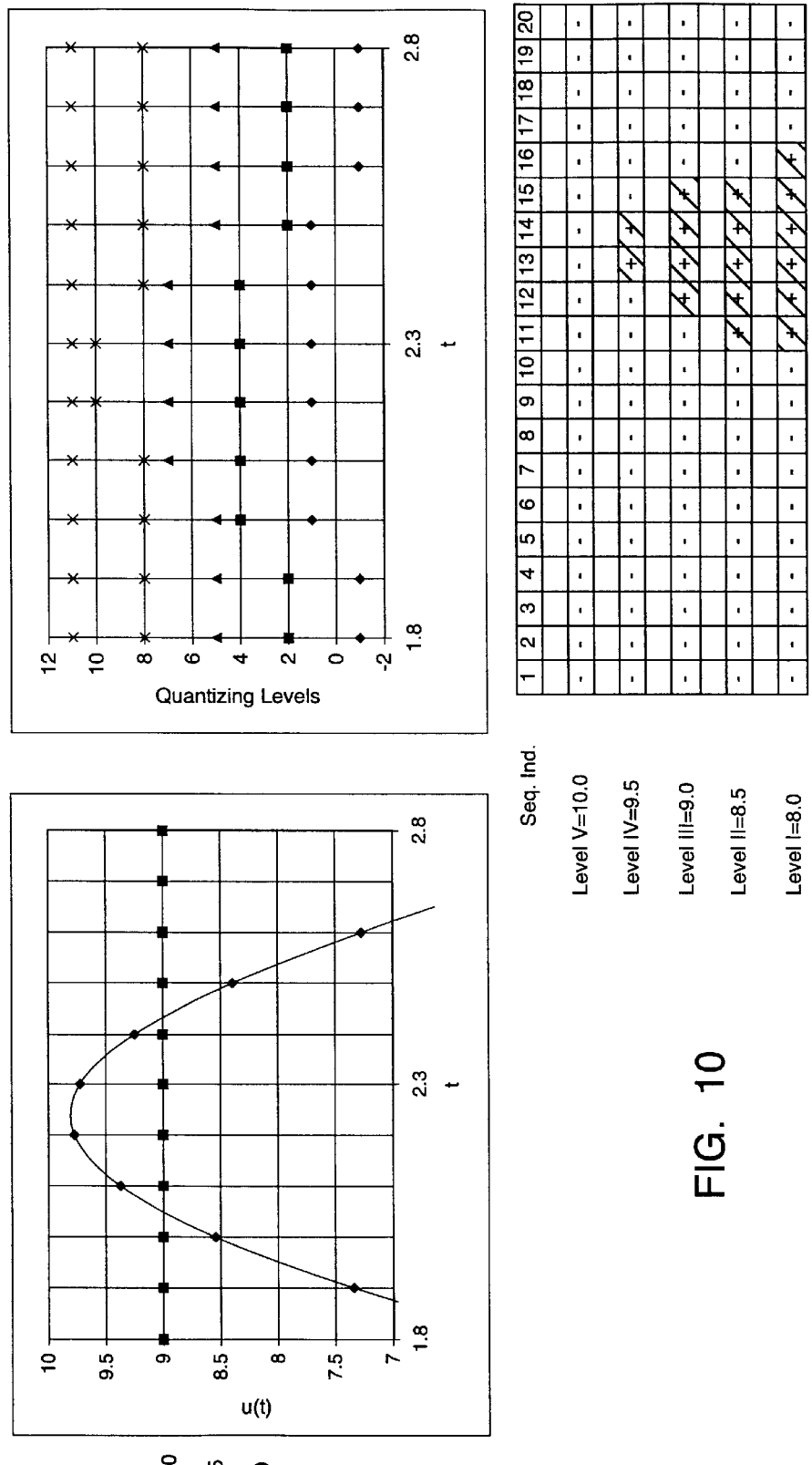
FIG. 10 illustrates the compensation of the measuring system's filter saturation by means of prediction.

Here, the value V is the filter's power supply voltage; the value $K_a$ is the preamplifier's amplification factor. The method of the present invention can be employed for a prediction of the moment of the possible filter's saturation. Then, the sub-measurement containing saturated filter would not be accounted for in the current measurement similar to what was presented in the expressions (3.33)–(3.35). To get that algorithm applicable to the current problem, the multiple-level quantification should be involved. Consider the following example. The fragment of the s(t) oscillogram is shown on the FIG. 10. The signal s(t) is a continuous function of the time-domain. This signal is quantified by 5 levels $s^{(I)}<s^{(II)}<s^{(III)}<s^{(IV)}<s^{(V)}$. Let us assume that the saturation threshold $s_{max}$ is associated with the fourth quantizing level $s^{(IV)}$. The quantification of the signal s(t) by these levels is performed according to the procedure (3.31, 3.32) where $u^o$ is substituted with respect to each quantizing level. The result of such actions is five binary processes $x_k(\tau)$, k=(1,2, . . . , 5). The analysis of these processes allows a conclusion that if there is no chance to predict a moment when the continuous signal s(t) exceeds the saturation threshold $s_{max} \equiv s^{(IV)}$, the process $x_3(\tau)$ of the lower quantizing level $s^{(III)}$ can be used for the prediction. The elementary behavioral functions of the process $x_3(\tau)$ encircle the moment of saturation observed in the binary process $X_4(\tau)$ Therefore, to work out the effect of a substantial non-linearity, we need to use a multi-dimensional predicting algorithm. The component with the highest predictability can be distinguished by evaluating each binary process $x_k(\tau)$, k=(1,2, ..., 5). The art of design is the establishment of the sufficient amount of quantizing levels in such measuring system. Like in the previous application, a multiplicative disturbance can be rejected by switching the system's input from the signal s(t) to a testing signal in order to adjust the system's unstable parameters. This switching has to be accomplished at the moment of prediction of the filter's saturation.

Application 3.

The Technical Method for the Econometric Time Series Analysis.

Figure 11:
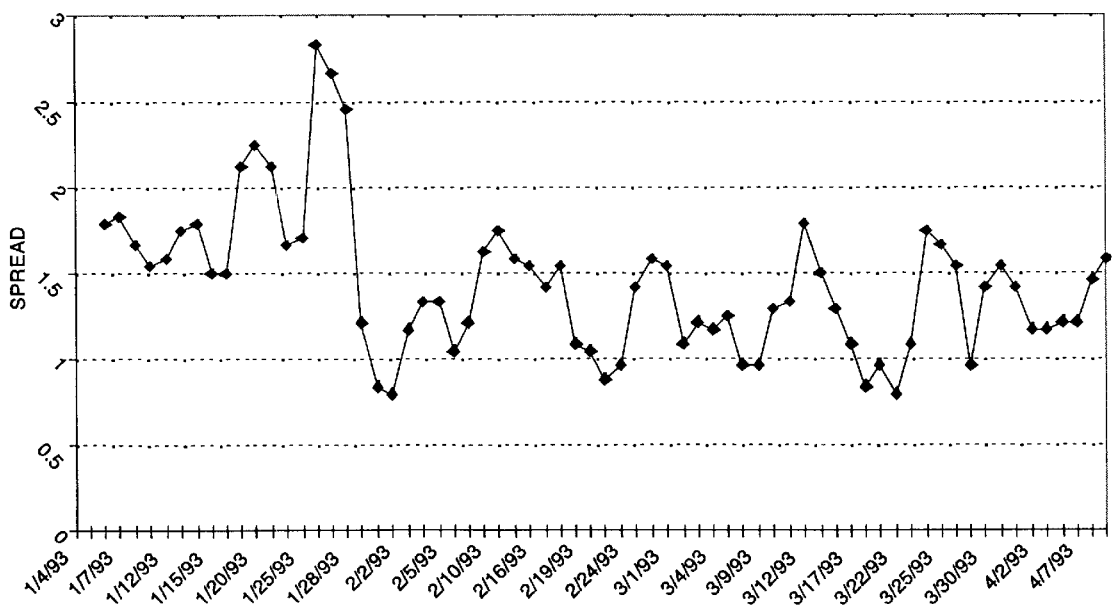
FIG. 11 depicts the fragment of the output of the three-point moving average function of the time series SPREAD.

The multi-dimensional version of the present invention can be used in econometrics known as the time series analysis. Let us show, for example, how to apply the method for technical analysis of the stock market time series. Let there be a time series, which is a 3-point moving average of the difference between the stock price "High" and the stock price "Low". These variables are very popular in the field of stock market. The illustration is presented in the FIG. 11. There, Spread= (High - Low). To get the time series ready for prediction by the method of the present invention, the procedure $B(\lambda, u^o)$ of the expressions (3.31, 3.32) should be applied. The time series Spread is already defined on the discrete time domain, i.e., the sampling parameter $\lambda$ is predetermined. Finally, the process $Spread(\tau) \equiv u(\tau) > 0$ of the present example has the following mapping on the vector $x(\tau)$ $$x(\tau)=B[\lambda,u^o,u(\tau)]=\{x_1(\tau),x_2(\tau),\ldots,x_n(\tau)\} \quad (3.48)$$

$\tau=t_1,t_2,\ldots,t_p$ $\forall t_i \ominus \tau \Rightarrow \lambda = t_i - t_{i-1}$ $$u^o=\{u^{(1)},u^{(2)},\ldots,u^{(n)}\} \quad (3.49)$$

The object of the econometric analysis is to determine whether or not the particular time series belongs to some interval on its range. Let us define each quantizing level of the (3.48) as such interval's upper/lower bound so that $$\forall t_i \in \tau \Rightarrow u(t_i) \in (u^{(j)},u^{(j+1)}), j=1,2,\ldots,n-1 \quad (3.50)$$

Therefore, every process $u(\tau)$ is linked to two binary processes $x_j(\tau)$ and $x_{j+1}(\tau)$ according to the statement (3.50). On the other hand, we could see in the previous example that there are cases where a forthcoming element of a binary process $x_j(\tau)$ will be "+" can not be determined with the sufficient predictability. In terms of the predicting method's efficiency evaluation (3.7), it means that $\phi_j(\tau,t_q,t_r)<\phi^*$, $\phi^*>1$. At the same time, the predictability of the fact that the next element of the same process $x_j(\tau)$ will be "−" is much greater than $\phi^*$. Having this reasoning, we may state that there are opposite cases when a forthcoming element of a binary process $x_j(\tau)$ will be "−" can not be determined with a sufficient predictability, and the predictability of the fact that the next element of the same process $x_j(\tau)$ will be "+" is much greater than $\phi^*$. In that instance, a set $q^o=\{q^{(1)},q^{(2)},\ldots,q^{(k)}\} \subseteq u^o$ of quantizing levels needs to be created so that $$q^o = \phi_{<Locating\ Condition>} u^o \quad (3.51)$$

Here, the <Locating Condition> is the following selection condition $$\phi^{(+)}_\nu(\tau,t_q,t_r)=\Phi[R^+(\tau,t_q,t_r),W^+(\tau,t_q,t_r)] \geq \phi^* \quad (3.52)$$

$$\phi^{(-)}_{\nu+1}(\tau,t_q,t_r)=\Phi[R^-(\tau,t_q,t_r),W^+(\tau,t_q,t_r)] \geq \phi^* \quad (3.53)$$

$R^l(\tau,t_q,t_r)$ - Number of correct predictions of the fact that the process $x(\tau)=$"l"

$W_l(\tau,t_q,t_r) = \neg R^l(\tau,t_q,t_r), l=("+","-"), \phi^*>1, \nu=1,2,\ldots,k-1$ Here, the evaluation function $\Phi[R^l(\tau,t_q,t_r),W^l(\tau,t_q,t_r)]$ is defined by the formula (3.7).

Returning to the econometric example, in order to obtain a prediction of the event that the forthcoming value of the econometric process $u(\tau)$ is going to lie in some of the intervals defined in the statement (3.50), we should require the following $$\forall t_i \in \tau \Rightarrow f[u(t_{i+1}) \in (q^{(\nu)},q^{(\nu+1)})] = f^+(t_{i+1}) \& f^-(t_{i+1}) \quad (3.54)$$

$q^{(\nu)} \in q^o$ $f^l(t_{i+1})=x(t_{i+1})="l" \Leftrightarrow$ "correct prediction"

$l=("+","-"), \nu=1,2,\ldots,k-1$

The quantizing level $q^{(\nu)}$ or $q^{(\nu+1)}$ and the corresponding binary process $x_\nu$ or $x_{\nu+1}$ in the statement (3.54) is determined by the expressions (3.52) or (3.53). In the case of evaluating the efficiency of prediction of the explicitly non-stationary time series, the expressions (3.51, 3.52, 3.53) may not be effective. Hence, the algorithm (3.54) should be changed as follows $$\forall t_i \in \tau \Rightarrow f[u(t_{i+1}) \in (u^{(\nu)},u^{(\nu+1)})] = f^+(t_{i+1}) \& f^-(t_{i+1}) \quad (3.55)$$

$u^{(\nu)} \in u^o$ $f^l(t_{i+1})=x(t_{i-1})="l" \Leftrightarrow$ "correct prediction"

$l=("+","-"), \nu=1,2,\ldots,n-1$

Figure 13:
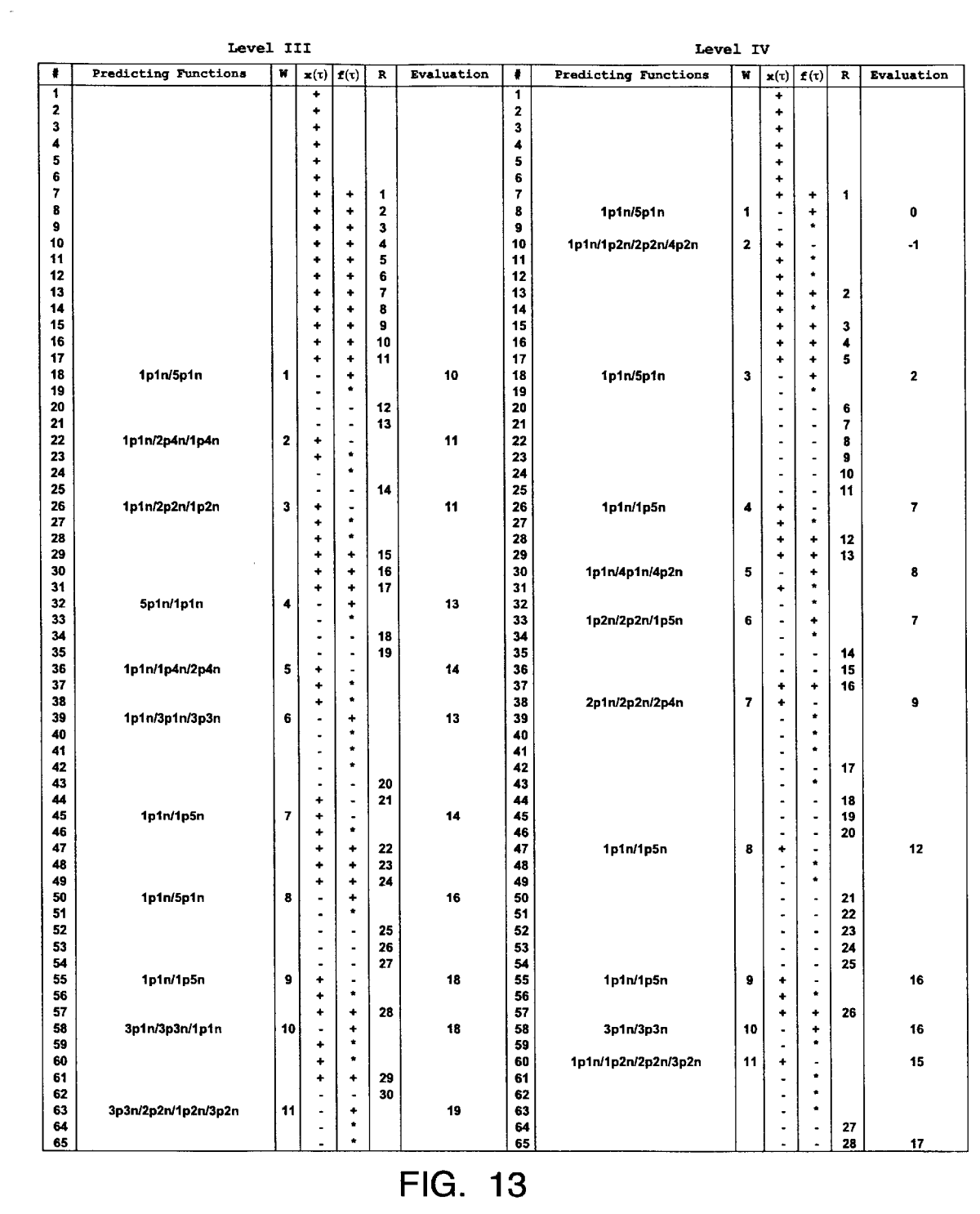

Regarding the present example, there were established six levels of quantification, and respectively six binary processes were created. The fragments of these processes are depicted in the FIG. 12. The protocol of predictions of the time series Spread($\tau$) being in the corridor ($1.25, $1.50), is shown in the FIG. 13. The estimation of such event's predictability was made by the evaluation functions $\phi^{(+)}(\tau, t_q, t_r)$ and $\phi^{(-)}(\tau, t_q, t_r)$ for $(t_{r-tq})=65$. They have revealed for the upper bound, $\phi^{(-)}=3.3$; and for the lower bound, $\phi^{(+)}(32\ 2.545$.

Application 4.

The Multi-Channel Data Acquisition System with the Most Informative Channel Prediction.

Let us consider the data acquisition system, which is basically comprised of several sources of data, transmitters that deliver data over some media or through an interface, receivers, and signal/data processing devices. Each informative channel experiences some interference existing in the form of additive and/or multiplicative disturbance. Typically, one or more channels demonstrate a lesser level of disturbance in comparison with other channels of the system if observed at any moment in time. In case of a necessity of receiving the correct data with each transaction, a prediction of the next free of disturbance channel can be performed by the method of the present invention. The approaches presented in the description of the Application 1 and Application 2 are useful in accomplishing this objective. The data processing device might be switched to receive information that will be coming through the less disturbed informative channel. The method of the present invention allows a simplification of the error correction algorithms, increases the memory capacity and the system's speed.

Application 5.

The Algorithm for Predicting the Quality of Schedule-Based Communication.

The cases that correspond with this application relate to those categories where the content of a message carries priority over the moment when the communication takes place. There are a number of such systems. An example could be a communication under a disaster condition. Here, the content of the message is vitally important, and the value of time spent for the setup of communication arrangement has a survival meaning as well. Another example could be a problem of a remote control of an object (a space ship, a nuclear power station, a chemical plant, etc.) with random failures. Providing a high quality cellular phone communication is also of that kind of a problem. The predicting method of the present invention is a possible solution for the above. The following sketch-algorithm is an illustration of how the method of a binary process prediction can be used for improving the quality of the cellular phone conversation. This is accomplished by predicting and subsequent advising of the user about the moment of the best physical conditions of communications. Let us assume that there is a cellular phone network where each user is linked to the host station.

1. Before a connection.
   Each telephone automatically responds to a time scheduled check-signal on the reserve frequency generated by the station. The responses are binary-classified by the good communication quality criterion and the users are respectively separated into two groups. Then, the forthcoming membership for both groups is predicted. A user may expect to receive an appropriate notifying message when attempting to contact any member of the "bad communication quality group".

2. During a communication.
   A continuous check—response dialog takes place between the host station and each communicator. This dialog is accompanied by the communication quality prediction. If a failure of some communication is predicted, then both participants may receive the notifying message.

We intentionally omitted in the presented above algorithm any details insignificant to the matter of the present invention. Such details are varying the "testing" and the "master" frequencies, type of massages, etc. This requires the proficiency in the technique of cellular phone communication.

However, an actual experiment was conducted in order to prove the idea. It is a known fact that a deterioration of the radiotelephone communication depends on landscape peculiarities and on the concentration of electrical lines. The typical urban area landscape details are buildings, road intersections with a number of electrical line nodes, and high voltage electrical transmitting lines. A car with one communicator talking via a cellular phone with his steady standing assistant was moving through the City of Boston, USA. The car's trajectory was traced on a map according to some sampling schedule. If at any discrete moment of the schedule a good quality of communication was observed, then the "+" sign was marked on the trace. If at any discrete moment of the schedule a poor quality of communication was observed, then the "−" sign was marked on the trace. An analysis of the observed data leads to a conclusion that an urban landscape may generate well predictable binary processes that can be used for the improvement of the quality of radiotelephone communication.

Application 6.

The Computer-based Game Background Algorithm.

The present invention may be viewed as a computer-based game's background algorithm where the human intelligence and the artificial intelligence compete. A human-player generates a binary string of elements of a finite length where a computer program must predict the forthcoming element's state. The number of correct and incorrect predictions is evaluated on at least one binary string length so that the human wins and respectively the artificial mind loses if some predetermined threshold is exceeded by the evaluation. In addition, a set of such evaluating thresholds and the predicting algorithm's internal parameters can be established by a human player to set a game to different levels of complexity. Thus, a different result in this game is expected depending on how skilled the human player is.

We can continue listing the examples unconditionally. Generally speaking, the present invention is applicable to any case where The mapping of some entity's characteristic on the space of binary processes is allowable The knowledge of the forthcoming element's state of that binary process is useful for making a conclusion or for performing an action.

Having described our invention we therefore claim:

1. A method for predicting a state of a binary element in a binary process and method being performed with the aid of computing means, said method comprising the steps of:

providing a computer-readable medium including instructions for:

forming a binary string for said binary process to obtain a history storage so that each new element of said binary process is an element of said binary string;

decomposing said binary string into structures of a minimal length to uniquely represent said binary string, said structures are built from opposed to each other adjacent sequences of identical states of said binary process element, such that a propagation of every said structure in both directions of said binary process domain returns a regular order;

selecting elements that are similar to said binary structures and may includes said structures;

combining said elements into an initial set of elements;

evaluating said binary string instability level if said instability level is not pre evaluated;

generating a resulting set of elements which is built from said initial set of elements depending on the evaluated level of said binary string instability;

sequentially predicting the state of forthcoming elements accumulating in a group in said binary string by applying an element vise predicting procedure acting upon said resulting set of elements;

updating said initial set of elements and reevaluating of said binary string instability level;

returning to the generating step of said method if additional predictions are needed;

whereby said sequential prediction of said binary element's state in stationary, quasi-stationary, and non stationary binary process is generated.

2. A method as claimed in claim 1, wherein:

said binary process may be a direct output of any entity, which is defined on a space of discrete binary processes; and said binary process may be a mapping of any other than said binary process kind entity's output onto the space of discrete binary processes.

3. A method as claimed in claim 1, further including the step of:
   generating said initial set of elements only if it is permitted by setting up an updating mode for said initial set to at least one of two binary components of a first permitting vector, said first permitting vector having a first component and a second component, said first component indicates a fact of said initial set predetermination, and said second component indicates a fact of beginning of creation of said initial set based on some schedule.

4. A method as claimed in claim 3, when at least one component of said first permitting vector is put to the updating mode for said initial set, further including the steps of:
   determining a statistically stable said decomposing structures with a maximal period;
   generating a first set containing all possible said decomposing structures including said maximal period structures, so that each element of said first set possesses the property of orthogonality; and
   generating said initial set of elements via the union of said first set and a second set of two opposite to each other elements, whose composition is a countable sequence of the identical binary elements of said binary process.

5. A method as claimed in claim 1, wherein;
   said element vise predicting procedure is a retrospective predicting procedure if said element vise predicting procedure is defined on an interval of said binary string domain which is antecedent to the latest observed element of said binary string; and
   said element vise predicting procedure is an actual predicting procedure if said element vise predicting procedure is defined on an interval of said binary string domain which includes the latest observed element of said binary string; and
   said predicting procedure is cyclic and each cycle is composed of two stages, and may contain several predictions.

6. A method as claimed in claim 5, further including the steps of:
   beginning each cycle of said predicting procedure at a starting point when an error of prediction occurs; and
   performing the first stage of each said predicting cycle through generation of a resulting set of elements by transforming said initial set into said resulting set, executed at the starting point of each said predicting cycle, so that a composition of said resulting set of elements depends on said evaluation of said current instability level of said binary string;
   performing the second stage of each said predicting cycle through a creation of a functional model of each forthcoming element of said binary process belonging to said current predicting cycle, and through a generation of a prediction permitting indicator, so that said prediction is an output of the Boolean conjunction of said model and said permitting indicator.

7. A method as claimed in claim 6, further including the steps of:
   determining the component of said estimating predicting efficiency vector function, that has an extreme value corresponding to the degree of the binary string stability; and
   selecting said resulting set of elements based on a composition of the set that corresponds to the extreme component of said estimating predicting efficiency vector function, such that each member of said resulting set possesses certain common and specific properties that depend on the object of prediction.

8. A method as claimed in claim 7 wherein:
   said resulting set's common properties are
   first, said resulting set is a mapping of said initial set;
   second, the cardinal number of said resulting set is inversely related to the evaluated said binary string instability level; and
   third, the state of each element of said resulting set is identical to the state of said binary string's element which is observed at the beginning of said predicting cycle.

9. A method as claimed in claim 7 wherein:
   said resulting set's specific property of any non stationary binary process is that said resulting set is a subset of said initial set.

10. A method as claimed in claim 7 wherein:
    said resulting set's specific property of some of non stationary binary process is that a resulting set's member is such a member of said initial set that can be observed on the interval closest to the beginning of the predicting cycle, and whose period is the maximal period among all members of said initial set observed on said interval; and
    said resulting set's specific property of some of non stationary binary process is that a resulting set's member is such a member of said initial set that can be observed on the closest to the beginning of the predicting cycle interval, and can be distinguished as a periodic function containing its full period; and
    said resulting set's specific property of some of non stationary binary process is that there is a relationship between at least one known member of said resulting set of elements and some other members of said resulting set related to said known member, such that for any binary element's state denoted by s, it is true that $(1s2\neg s) \Rightarrow (2s2\neg s)$, $(2s2\neg s) \Rightarrow (2s1\neg s)$, $(1s3\neg s) \Rightarrow (2s3\neg s)$ v $(3s3\neg s)$, $(2s3\neg s) \Rightarrow (1s3\neg s)$ v $(3s3\neg s)$, $(3s3\neg s) \Rightarrow (1s3\neg s) v (2s3\neg s)$, where the left part of each statement defines known member of said resulting set, and the right part of each statement defines all other members of said resulting set that are related to said known member; and
    said resulting set's specific property of some of non stationary binary process is that there is a relationship between a sequence of two or three identical binary process elements found on the binary process decomposition, which are adjoined to the beginning moment of a predicting cycle and some members of said resulting set related to said sequence of binary process elements, such that for any binary element's state denoted by s, it is true that $2s \Rightarrow (2s2\neg s)$ v $(2s1\neg s)$, $3s \Rightarrow (3s3\neg s)$ v $(3s2\neg s)$ v $(3s1\neg s)$, where the left part of each statement defines said sequence of binary process elements, and the right part of each statement defines all members of said resulting set that are related to said sequence of binary process elements; and
    said resulting set's specific property of some of non stationary binary process is that the first member of said initial set is a member of said resulting set, and both members of said second set are the members of said resulting set.

11. A method as claimed in claim 7 wherein:

said resulting set's specific property of another non stationary binary process is that a resulting set's member is such a member of said initial set that can be observed on the interval closest to the beginning of the predicting cycle, and can be distinguished as a periodic function containing its full period; and said resulting set's specific property of another non stationary binary process is that there is a relationship between at least one known member of said resulting set of elements and some other members of said resulting set related to said known member, such that for any binary element's state denoted by s, it is true that $(1s2_\neg s) \Rightarrow (2s2_\neg s)$, $(2s2_\neg s) \Rightarrow (2s1_\neg s)$, $(1s3_\neg s) \Rightarrow (2s3_\neg s)$ v $(3s3_\neg s)$, $(2s3_\neg s) \Rightarrow (1s3_\neg s)$ v $(3s3_\neg s)$, $(3s3_\neg s) \Rightarrow (1s3_\neg s)$ v $(2s3_\neg s)$, where the left part of each statement defines known member of said resulting set, and the right part of each statement defines all other members of said resulting set that are related to said known member; and said resulting set's specific property of another non stationary binary process is that there is a relationship between a sequence of two or three identical binary process elements found on the binary process decomposition, which are adjoined to the beginning moment of a predicting cycle and some members of said resulting set related to said sequence of binary process elements, such that for any binary element's state denoted by S, it is true that $2s \Rightarrow (2s2_\neg s)$ v $(2s1_\neg s)$, $3s \Rightarrow (3s3_\neg s)$ v $(3s2_\neg s)$ v $(3s1_\neg s)$, where the left part of each statement defines said sequence of binary process elements, and the right part of each statement defines all members of said resulting set that are related to said sequence of binary process elements; and said resulting set's specific property of another non stationary binary process is that both members of said second set are the members of said resulting set.

12. A method as claimed in claim 6 wherein:

said functional model of a forthcoming element of said binary process is a nonlinear transformation of a base model;

said nonlinear transformation of the base model includes an inversion of said model's output based on a result of a conjunction of two binary components of a third permitting vector;

said first component of the third permitting vector is an indicator of the inversion mode initiation, and said second component of the third permitting vector indicates the beginning of said inversion when an output of a current predicting efficiency estimating function is within a specified distance of a predetermined threshold value, and the second component of said third permitting vector also indicates the end of said inversion if a new error of prediction is observed;

said base model is a union of those members of said resulting set that are allowed to participate in the base model;

the allowance of participation in said base model includes that each member of said resulting set participates in the current cycle of predictions since the beginning of said cycle until this member produces an incorrect prediction, and this member may again participate in the prediction only in the next predicting cycle;

said prediction permitting indicator is a conjunction of three binary components of a fourth permitting vector;

said first component of the fourth permitting vector is an indicator of the prediction blocking mode initiation, and said second component of the fourth permitting vector reflects the fact of beginning of said prediction blocking mode when a value of said current predicting efficiency estimating function is within a specified distance of another predetermined threshold value, and the second component of said fourth permitting vector also indicates the end of said blocking if a new error of prediction is observed, and said third component of the fourth permitting vector is a conjunction of all members of said resulting set that participate in said base model.

13. A method as claimed in claim 1, further including the step of:

evaluating said instability of said binary string only if it is permitted by setting up an evaluation updating mode to at least one of two binary components of a second permitting vector, whose first component indicates a fact of said evaluation predetermination, and whose second component indicates a fact of beginning of said evaluation based on some schedule.

14. A method as claimed in claim 7, when at least one component of a second permitting vector is put to the evaluation updating mode further including the step of:

performing said binary string instability evaluation through a calculation of an estimating vector function of predicting efficiency involving but not limited to a retrospective predicting procedure, which is specific for each component of said estimating vector function and is defined on said binary string domain.

15. A method as claimed in claim 14, wherein:

said estimating vector function of predicting efficiency is a vector whose each component is an aggregation function of a sequence of outputs of said retrospective predicting procedure, which acts upon a specific for this component pre selected set of elements, which is a mapping of said initial set of elements;

one of said pre selected sets can be said initial set itself; and any component of said estimating vector function of predicting efficiency can be predetermined to control the composition of said resulting set of elements.

16. A method as claimed in claim 1 being embedded in a method of time series analysis further including the steps of:

mapping a non binary time series into said vectorial binary process, such that each said component of vectorial binary process component is a product of said time series' quantification, such quantification is based on values of corresponding components of a vector of quantizing levels;

selecting a first group of components of said vectorial binary process that are suitable for a prediction of the event that a forthcoming element of each member of said first group of components will be located higher than some predetermined position on said time series range;

selecting a second group of components of said vectorial binary process that are suitable for a prediction of the event that a forthcoming element of each member of said second group of components will be located lower than some predetermined position on said time series range;

predicting the forthcoming element's state of each binary process in both groups; and finding a pair of the most proximate, in terms of a location on said time series range, predictions such that the first element of said pair belongs to a binary process from said first group and the second element of said pair belongs to a binary process from said second group;

whereby the position of said time series value in its range is predicted to be in a narrowed corridor, and said corridor is bound by functions of said time series discrete argument.

17. A method as claimed in claim 16 wherein:

selecting said groups of components of said vectorial binary process may involve evaluating predicting efficiency of each component by applying said retrospective predicting procedure;

predicting the forthcoming element's state of each binary process from both of the groups of components involves said actual predicting procedure.

18. A method as claimed in claim 1 being embedded in an algorithm for predicting the quality of schedule based communication further including the steps of:

sending a schedule based test signal to each communicator;

receiving a response to said test signal from each communicator;

classifying and then distributing said communicators into two groups by a binary criterion of quality of communication having said responses as values for an independent variable, such that members of one group are classified as having a good quality of communication, and members of the other group are classified as having a bad quality of communication; and predicting a forthcoming element's state in a binary process representing said quality of communication of each communicator;

generating a notifying message for any communicator attempting to contact a member of the group with predicted bad quality of communication;

generating a notifying message if said bad quality of communication is predicted for any of participants during communication.

19. A predicting algorithm as claimed in claim 1 being embedded in a computer based game wherein:

said algorithm is a part of said game's background algorithm;

in said game the human intelligence and the artificial intelligence compete so that human tries to challenge a computer program by creating binary puzzles the computer program must solve;

in said game's background algorithm said binary puzzle is represented by a binary string of a finite length;

during the play, each element of said binary string is inserted sequentially into a computing device, whose artificial cognitive algorithm must predict the state of said binary element before said element has been inserted;

the number of correct and incorrect predictions is evaluated on at least one binary string length so that human wins and respectively artificial mind loses if some predetermined threshold is exceeded by said evaluation;

in said background algorithm different said evaluating thresholds and said algorithms internal parameters can be setup by a player to get a game with different levels of complexity;

whereby depending on how skilled the human player is, a different result of said competition is expected.

20. A computing means implemented system for a sequential prediction of a binary element's state in a binary process, comprising:

a computer-readable medium residing in a computing means implemented system further comprising:

a first subsystem including means for determination of said initial set of elements;

a second subsystem including means for prediction of a binary element's state in a binary process;

computing and controlling means, which receive, process, transfer, and exchange information between said system's elements and between said system and the environment thereof;

whereby said system implements a sequential prediction of any binary process and can be embedded in any entity that permits mapping of at least one of the entity's output onto the space of binary processes.

21. A system as claimed in claim 20 wherein:

said first subsystem is a plurality of channels, and each of said channels serves for the purpose of determination of said initial set of a corresponding single binary process;

said second subsystem is a plurality of channels, and each of said channels serves for the purpose of prediction of a binary element's state in a corresponding single binary process;

each single channel of said first subsystem transfers information about said initial set composition to each corresponding single channel of said second subsystem.

22. A system as claimed in claim 20 having said first subsystem further including:

means for mapping an output of an object of prediction into at least one binary sequence, means for binary process formation hereafter;

each single channel of said first subsystem comprising means for binary process history storage, means for creation of said initial set, means for data sampling, and means for binary process shortest history storage.

23. A system as claimed in claim 20 having said single channel of said first subsystem wherein:

said means for binary process history storage memorize each sequential element of said binary process coming to a first input thereof from said means for binary process formation;

said means for binary process history storage, being controlled by an output of said means for data sampling, form a binary string at an output of said means for binary process history storage;

said binary string goes from said means for binary process history storage to a first input of said means for creation of said initial set, and said binary string also goes to a first input of said means for binary process shortest history storage, and a second input thereof receives information from the first output of said means for creation of said initial set, and said first output of said initial set is also connected to an input of said means for data sampling;

a second input of said means for creation of said initial set is a control input, that is external to the predicting system for a first component assignment of said first permitting vector;

a third input of said means for creation of said initial set receives information from said corresponding single channel of said second subsystem about the status of said error of prediction indicator to be used for the determination of a second component of said first permitting vector; and said second output of said means for creation of said initial set is a second output of said single channel of said first subsystem, and the output of means for binary process shortest history storage is a first output of said single channel of said first subsystem.

24. A system as claimed in claim 20 having said second subsystem further including:
   each single channel of said second subsystem comprising a main predicting contour including means for selection of main resulting set and means for actual prediction; and
   each single channel of said second subsystem comprising an auxiliary instability evaluating contour, which is a plurality of tracts connected to means for evaluating of the binary process current instability.

25. A system as claimed in claim 24 having said main predicting contour of said single channel of said second subsystem wherein:
   a first input of said means for selection of main resulting set is utilized for determination of members of main resulting set, in case of external to the predicting system control;
   the second input of said means for selection of main resulting set receives data from said means for binary process shortest history storage;
   a third input of said means for selection of main resulting set receives data from said means for evaluating of said binary process current instability, so that said composition of the main resulting set depends on a value of said third input;
   an output of said means for selection of main resulting set is connected to a third input of said means for actual prediction;
   a first input of said means for actual prediction is a control input for assignment of said first component of said third permitting vector in case of external to the predicting system control;
   a second input of said means for actual prediction is a control input for assignment of said first component of said fourth permitting vector in case of external to the predicting system control;
   a first output of said means for actual prediction is intrinsically a prediction of a binary element's state in the corresponding binary process;
   a second output of said means for actual prediction is a binary indicator of said error of prediction that comes to said third input of said means for creation of said initial set of said corresponding channel in said first subsystem to be used for determination of said second component of said first permitting vector; and
   said second output of said means for actual prediction also goes to each tract of said auxiliary instability evaluating contour.

26. A system as claimed in claim 24 having said auxiliary instability evaluating contour of said single channel of said second subsystem further including:
   each said single tract comprising consecutively connected means for assigning an auxiliary resulting set, means for retrospective prediction, and means for analyzing of said binary process retrospective instability.

27. A system as claimed in claim 26 having said single tract of said auxiliary instability evaluating contour of said single channel of said second subsystem wherein:

a first input of said means for assigning an auxiliary resulting set receives information about the composition of said initial set of elements from said second output of said corresponding channel of said first subsystem;
   a second input of said means for assigning an auxiliary resulting set is a control input for assignment of said first component of said second permitting vector in case of external to the predicting system control;
   a third input of said means for assigning an auxiliary resulting set receives information about the status of said error of prediction indicator to be used for determination of said second component of said second permitting vector;
   an output of said means for assigning an auxiliary resulting set contains information about a composition of said auxiliary resulting set, which is tract specific; and
   said means for retrospective prediction performs said retrospective predicting procedure acting upon elements of said auxiliary resulting set, so that information about each correct and each incorrect prediction is aggregated by said means for analyzing of said binary process retrospective instability, whose output is a quantitative evaluation of said corresponding binary string instability, which is also an input of said means for evaluating of said binary process current instability.

28. A system as claimed in claim 24 having said auxiliary instability evaluating contour of said single channel of said second subsystem wherein:
   said means for evaluating of said binary process current instability select a value among the values represented by the outputs of each of said tracts, where said value is the best indicator of said binary process current instability, and said means for evaluating of said binary process current instability reveal at an output thereof an ordering number of that tract at the output of which the best indicating value was found.

29. A system as claimed in claim 16 having computing and controlling means for receiving, processing, transferring, and exchange of information between the elements of said system and between said system and an environment thereof wherein including:
   means for signal to data conversion and means for data to signal conversion;
   means for mapping of any non binary process on the space of binary processes;
   means for inserting, writing, reading, and modifying data represented by scalars, vectors, and matrices;
   means for storing a region of said binary process, forming a binary string so that each new element of said binary process is an element of said binary string;
   means for numerical processing and for quantitative analysis of said binary string including means for decomposition, means for data sampling of said decomposition data, means for statistical analysis of said decomposition data, means for creating data sets having functional forms as members of said data sets, means for aggregating strings of values;
   whereby said means aid accurate and stable functioning of said predicting system.

30. A system as claimed in claim 16 being embedded in a measuring system further including:
   means for an input signal filtering;
   means for performing measuring block procedures;
   means for sequential prediction of a binary elements' state in a binary process;

means for calculating a resulting measurement; and means for controlling a system's working modes.

31. A system as claimed in claim 30 wherein:

said input signal and a filtered input signal are used together for generating a signal to noise ratio signal;

said signal to noise ratio variable is considered a non binary process and converted to a binary process representing current level of disturbance evaluation in said system;

the signal to noise evaluation is predicted element by element through the utilization of said predicting subsystem;

each measuring block procedure is executed at a pace related to said signal to noise ratio evaluation, and only that measuring block procedure output is accounted in said resulting measurement, whose predicted signal to noise ratio evaluation indicates a low level of disturbance in said measuring system;

said resulting measurement is an aggregation of a number of permitted for said aggregation outputs of said measuring block procedure so that the part of disturbance in said system output becomes minimized;

said measuring system's input is switched to a noiseless testing signal when the high level of disturbance is predicted, so that said measuring system may provide compensation for a multiplicative disturbance;

whereby the accuracy of any measuring system can be significantly improved in those cases when further filtration of any kind is not effective.

32. A system as claimed in claim 20 being embedded in an another system with essential non linearity further including:

said system having essential nonlinear element;

means for said nonlinear element's input measurement;

means for a sequential prediction of a binary elements' state in a binary process; and means for performing any actions preventing harmful affection of said system's non linearity.

33. A system as claimed in claim 32 wherein:

said nonlinear element's input is measured and evaluated by comparison to a predetermined threshold value that is a parameter of said nonlinear element's snap condition; and means for binary process formation of said predicting means generates said vectorial binary process whose each component characterizes certain distance to said threshold;

said predicting means provide a prediction of a forthcoming element of each component of said vectorial binary process; and means for performing any actions preventing harmful affection of said system's non linearity receive information about said forthcoming element's state of said vectorial binary process, analyses said forecast, and generates appropriate control actions.

34. A system as claimed in claim 20 being embedded in a multi channel data acquisition system providing a selection of a most informative channel further including:

several sources of data;

means for transmitting, receiving, and processing data over multiple informative channels;

means for generating an indicator, value of which is related to a signal to noise ratio appearing at an input of said receiving means of each said informative channel;

means for a sequential prediction of a binary elements' state in a vectorial binary process; and means for selecting an informative channel of said multi channel data acquisition system.

35. A system as claimed in claim 34 wherein:

every said indicator, that is related to signal to noise ratio, is evaluated by at least one predetermined signal to noise ratio level, and a corresponding binary string is generated and stored in said means for a sequential prediction of a binary elements' state in a vectorial binary process;

a forthcoming element's state of each said binary string is predicted; and the channel whose signal to noise ratio is predicted to be the highest among all said channels, is selected as a preferable channel for the next data transmissions whereby with each moment of a transaction, said data acquisition system collects data with a lowest disturbance magnitude.

36. A method for predicting a state of a binary element in a binary process, said method being implemented within computer-readable medium of computing means, said method comprising the steps of:

converting a sequence of values of a variable related to a functioning entity into a plurality of binary processes by using a computing means;

forming a binary string of a finite length for each said binary process to obtain a history storage so that each new element of said binary process is an element of said binary string;

generating for each said binary string an initial set of predicting solutions;

evaluating each said binary string's transients effect on said binary string's predictability if said transients effect is not pre evaluated;

generating for each binary string a resulting set of predicting solutions which is built from said initial set of predicting solutions depending on said evaluated binary string's transients effect;

sequentially predicting the state of each element in a temporal group of forthcoming elements in each said binary string through the application of an element vise predicting procedure acting upon each said resulting set of predicting solutions;

updating each said initial set of predicting solutions and reevaluating each said binary string's transients effect, if necessary; and returning to generating each said resulting set of predicting solutions;

whereby said sequential prediction of said binary element's state in each stationary, quasi-stationary, and non stationary binary process is generated for said functioning entitle by said computing means.

37. A method as claimed in claim 36, wherein:

said binary process is a mapping of a process of said functioning entity on the space of discrete binary processes providing the-process of said entity functioning internal representation in said computing system.

38. A method as claimed in claim 36, further including the steps of:

generating said initial set of elements only if it is permitted by setting up an updating mode of said initial set to at least one of two binary components of a first permitting vector, said permitting vector having a first component and a second component, said first component indicates that said initial set was predetermined, and said second component indicates whether to begin creation of said initial set based on some schedule.

39. A method as claimed in claim 38, when at least one component of said first permitting vector is put to the updating mode of said initial set, further including the steps of:

expanding each said binary string into uniquely representing said binary string functional structures of a minimal length, which are built from opposed to each other adjacent sequences of identical states of said binary process element, such that a propagation of every said structure in both directions of said binary process domain returns a binary periodical function, which is a prototype of said predicting solution;

determining a statistically robust said functional structures with a maximal period;

generating a first set of predicting solutions containing all possible said structures including said maximal period functional structures, so that each element of said first set possesses the property of orthogonality; and generating said initial set of predicting solutions via the union of said first set and a second set of two opposite to each other predicting solutions, whose composition is a countable sequence of the identical binary elements of said binary process.

40. A method as claimed in claim 36, wherein:

said element vise predicting procedure is a retrospective predicting procedure if said element vise predicting procedure is defined on an interval of said binary string domain which is antecedent to the latest observed element of said binary string; and said element vise predicting procedure is an actual predicting procedure if said element vise predicting procedure operates upon the latest observed element of said binary string; and said predicting procedure is non iterative, is cyclic, and each cycle is composed of two stages, and may contain several predictions.

41. A method as claimed in claim 40, further including the steps of:

beginning each cycle of said predicting procedure at a starting point when an error of prediction occurs;

performing the first stage of each said predicting cycle through generation of a resulting set of predicting solutions by mapping said initial set on said resulting set, executed at the starting point of each said predicting cycle, so that a composition of said resulting set of predicting solutions depends on said evaluation of said current transients effect of said binary string; and performing the second stage of each said predicting cycle through generation of a functional model of each forthcoming element from a temporal group of said binary string's elements belonging to said current predicting cycle, and through a generation of a prediction permitting indicator, so that said element vise prediction is an output of the Boolean conjunction of said model and said permitting indicator.

42. A method as claimed in claim 41, further including the steps of:

determining a component of said estimating predicting efficiency vector function, that has an extreme value; and selecting said resulting set of predicting solutions based on a composition of said specific set that corresponds to the extreme component of said estimating predicting efficiency vector function, such that each member of said resulting set possesses certain common and specific properties that depend on said entity's specificity.

43. A method as claimed in claim 42, wherein:

said resulting set's common properties are first, said resulting set is a mapping of said initial set;

second, the cardinal number of said resulting set is inversely relates to the evaluated said binary string's transients effect on predictability; and third, if being observed at the beginning of said predicting cycle, the binary state of each member of said resulting set of predicting solution is identical to the state of said binary string's element having observed at the beginning of the same predicting cycle.

44. A method as claimed in claim 42, wherein:

said resulting set's specific property of any non stationary binary process is that said resulting set is a subset of said initial set of predicting solutions.

45. A method as claimed in claim 42, wherein:

said resulting set's specific property of some of non stationary binary process is that a resulting set's member is such a member of said initial set of predicting solutions that can be observed on the interval next to the beginning of the predicting cycle, and whose period is the maximal period among all observed on said interval members of said initial set;

said resulting set's specific property of some of non stationary binary process is that a resulting set's member is such a member of said initial set that can be observed on the interval next to the beginning of the predicting cycle, and can be distinguished as a periodic function containing its full period;

said resulting set's specific property of some of non stationary binary process is that there is a relationship between at least one known member of said resulting set of predicting solutions and some other members of said resulting set related to said known member, such that for any binary element's state denoted by s, it is true that $(1s2_\neg s) \Rightarrow (2s2_\neg s)$, $(2s2_\neg s) \Rightarrow (2s1_\neg s)$, $(1s3_\neg s) \Rightarrow (2s3_\neg s) \vee (3s3_\neg s)$, $(2s3_\neg s) \Rightarrow (1s3_\neg s) \vee (3s3_\neg s)$, $(3s3_\neg s) \Rightarrow (1s3_\neg s) \vee (2s3_\neg s)$, where the left part of each statement defines known member of said resulting set, and the right part of each statement defines all other members of said resulting set that are related to said known member;

said resulting set's specific property of some of non stationary binary process is that there is a relationship between a sequence of two or three identical binary process elements found on the binary process decomposition, which are adjoined to the beginning moment of a predicting cycle and some members of said resulting set related to said sequence of binary process elements, such that for any binary element's state denoted by s, it is true that $2s \Rightarrow (2s2_\neg s) \vee (2s1_\neg s)$, $3s \Rightarrow (3s3_\neg s) \vee (3s2_\neg s) \vee (3s1_\neg s)$, where the left part of each statement defines said sequence of binary process elements, and the right part of each statement defines all members of said resulting set that are related to said sequence of a binary process elements; and said resulting set's specific property of some of non stationary binary process is that the first member of said initial set of predicting solutions is a member of said resulting set, and both members of said second set are the members of said resulting set.

46. A method as claimed in claim 42, wherein:

said resulting set's specific property of another non stationary binary process is that a resulting set's member is such a member of said initial set that can be observed on the interval next to the beginning of the predicting cycle, and can be distinguished as a periodical function containing its full period;

said resulting set's specific property of another non stationary binary process is that there is a relationship between at least one known member of said resulting set of elements and some other members of said resulting set related to said known member, such that for any binary element's state denoted by s, it is true that $(1s2\neg s) \Rightarrow (2s2\neg s)$, $(2s2\neg s) \Rightarrow (2s1\neg s)$, $(1s3\neg s) \Rightarrow (2s3\neg s)$ v $(3s3\neg s)$, $(2s3\neg s) \Rightarrow (1s3\neg s)$ v $(3s3\neg s)$, $(3s3\neg s) \Rightarrow (1s3\neg s)$ v $(2s3\neg s)$, where the left part of each statement defines known member of said resulting set, and the right part of each statement defines all other members of said resulting set that are related to said known member;

said resulting set's specific property of another non stationary binary process is that there is a relationship between a sequence of two or three identical binary process elements found on the binary process decomposition, which are adjoined to the beginning moment of a predicting cycle and some members of said resulting set related to said sequence of binary process elements, such that for any binary element's state denoted by s, it is true that $2s \Rightarrow (2s2\neg s)$ v $(2s1\neg s)$, $3s \Rightarrow (3s3\neg s)$ v $(3s2\neg s)$ v $(3s1\neg s)$, where the left part of each statement defines said sequence of binary process elements, and the right part of each statement defines all members of said resulting set that are related to said sequence of binary process elements; and said resulting set's specific property of another non stationary binary process is that both members of said second set are the members of said resulting set.

47. A method as claimed in claim 41, wherein:

said functional model of a forthcoming element of said binary process is a nonlinear transformation of a base model;

said nonlinear transformation of the base model includes an inversion of said model's output based on a result of a conjunction of two binary components of a third permitting vector;

said first component of the third permitting vector is an indicator of the inversion mode initiation, and said second component of the third permitting vector indicates the beginning of said inversion when an output of a current predicting efficiency estimating function is within a specified distance of a predetermined threshold value, and the second component of said third permitting vector also indicates the end of said inversion if a new error of prediction is observed;

said base model is a union of those members of said resulting set of predicting solutions that are allowed to participate in the base model;

the allowance of participation in said base model includes that each member of said resulting set participates in the current cycle of predictions since the beginning of said cycle until this member produces an incorrect prediction, and this member may again participate in the prediction only in the next predicting cycle;

said prediction permitting indicator is a conjunction of three binary components of a fourth permitting vector; and said first component of the fourth permitting vector is an indicator of the prediction blocking mode initiation, and said second component of the fourth permitting vector reflects the fact of beginning of said prediction blocking mode when a value of said current predicting efficiency estimating function is within a specified distance of another predetermined threshold value, and the second component of said fourth permitting vector also indicates the end of said blocking if a new error of prediction is observed, and said third component of the fourth permitting vector is a conjunction of all members of said resulting set that participate in said base model.

48. A method as claimed in claim 36, further including the step of:

evaluating said transients effect of said binary string only if it is permitted by setting up an evaluation updating mode to at least one of two binary components of a second permitting vector, whose first component indicates a fact of said evaluation predetermination, and whose second component indicates a fact of beginning of said evaluation based on some schedule.

49. A method as claimed in claim 48, when at least one component of said second permitting vector is set up to the evaluation updating mode further including the step of:

performing said binary string's transients effect evaluation through a calculation of an estimating vector function of predicting efficiency involving said retrospective predicting procedure, which is specific for each component of said estimating vector function and is defined on said binary string domain.

50. A method as claimed in claim 49, wherein:

said estimating vector function of predicting efficiency is a vector whose each component is an aggregation function of a sequence of outputs of said retrospective predicting procedure, which acts upon a specific for this component pre selected set of predicting solutions, which is a mapping of said initial set of predicting solutions;

one of said pre selected sets can be said initial set itself; and any component of said estimating vector function of predicting efficiency can be predetermined controlling the composition of said resulting set of predicting solutions.

51. A computer program product for predicting of a state of a binary element in a binary process having a functioning entity or an improvement of said functioning entity, said product executable in a computer readable environment, said product having instructions for:

converting an observable sequence of values of a variable related to said functioning entity into a plurality of binary processes providing for said sequence of values internal representation in said product;

forming a binary string of a finite length for each said binary process history storage so that each new element of said binary process is an element of said binary string;

generating for each said binary string an initial set of predicting solutions;

evaluating each said binary string's transients effect on said binary string's predictability if said transients effect is not pre evaluated;

generating for each binary string a resulting set of predicting solutions which is built from said initial set of predicting solutions depending on said evaluated binary string's transients effect;

sequentially predicting the state of each element in a temporal group of forthcoming elements in each said binary string through the application of an element vise predicting procedure acting upon each said resulting set of predicting solutions;

updating each said initial set of predicting solutions and reevaluating each said binary string's transients effect; and returning to generating step for each said resulting set of predicting solutions if additional predictions are needed;

whereby said sequential prediction of said binary element's state in each stationary, quasi-stationary, and non stationary binary process providing said internal representation of said sequence of values for said functioning entity or for said improvement of said functioning entity by said product is generated.

52. A product as claimed in claim 51, wherein:

said observable sequence of values of a variable denoted u(t) and related to said entity's functioning is converted into said plurality of binary processes by an application of a quantizing procedure denoted $B(\lambda, u^o)$, whose one possible realization for continuous u(t) is described by formulas:

$$x(\tau) = B(\lambda u^o) u(t) \quad (1)$$

$$\tau = t_1, t_2, \ldots, t_p \quad (2)$$

$$\lambda = (t_{i+1} - t_i)$$

$$\forall u^o > 0, [|u(t_i)| - u^o] > 0 \Rightarrow x(t_i) = b_1 \quad (3)$$

$$\forall u^o > 0, [|u(t_i)| - u^o] \leq 0 \Rightarrow x(t_i) = b_2 \quad (4)$$

$$b_1 = \neg b_2$$

$$u^o \subset U$$

wherein $\lambda$ denotes sampling rate, denotes discrete time and $u^o$ denotes a vector of quantizing levels.

53. A product as claimed in claim 52, wherein:

formula (2) defines a vectorial time sampling procedure; and formulas (3), (4) define an amplitude quantification procedure.

54. A product as claimed in claim 52, further including:

performing a two stage quantification procedure according to the formula (1) such that said continuous variable u(t) is mapped onto the space of discrete processes, and then said variable experiences said amplitude quantification;

whereby, said continuous variable u(t) becomes converted into said plurality of binary processes $x(\tau)$ suitable for processing by said product.

* * * * *